US006865001B2

(12) United States Patent
Long et al.

(10) Patent No.: US 6,865,001 B2
(45) Date of Patent: Mar. 8, 2005

(54) SYSTEM AND METHOD FOR ENCODING AND DECODING AN IMAGE OR DOCUMENT AND DOCUMENT ENCODED THEREBY

(75) Inventors: Michael D. Long, Santa Cruz, CA (US); Diana Newcomb, Santa Cruz, CA (US)

(73) Assignee: Pacific Holographics, Inc., Santa Cruz, CA (US)

(*) Notice: Subject to any disclaimer, the term of this patent is extended or adjusted under 35 U.S.C. 154(b) by 37 days.

(21) Appl. No.: 10/215,388

(22) Filed: Aug. 7, 2002

(65) Prior Publication Data

US 2003/0039195 A1 Feb. 27, 2003

Related U.S. Application Data

(60) Provisional application No. 60/310,749, filed on Aug. 7, 2001.

(51) Int. Cl.[7] ............................................... G03H 1/00
(52) U.S. Cl. .............................. 359/2; 359/22; 283/86; 283/93; 430/10
(58) Field of Search .......................... 359/1, 2, 32, 33, 359/558, 566, 22, 567; 283/86, 85, 93, 901; 356/71; 430/10; 428/29, 916

(56) References Cited

U.S. PATENT DOCUMENTS

| | | | |
|---|---|---|---|
| 3,178,993 A | 4/1965 | Ferris et al. ................... 380/54 |
| 3,524,395 A | 8/1970 | Alasia ......................... 396/329 |
| 3,675,948 A | 7/1972 | Wicker ........................ 283/67 |
| 3,676,000 A | 7/1972 | Mayer, Jr. et al. ............ 355/52 |
| 3,784,289 A | 1/1974 | Wicker et al. ............... 359/896 |
| 3,894,756 A | 7/1975 | Ward et al. ................... 283/86 |
| 3,914,877 A | 10/1975 | Hines et al. .................. 380/54 |
| 3,937,565 A | 2/1976 | Alasia et al. ................. 380/54 |
| 4,586,711 A | 5/1986 | Winters et al. .......... 273/138.1 |
| 5,032,003 A | 7/1991 | Antes ......................... 359/567 |
| 5,197,765 A | 3/1993 | Mowry et al. ............... 283/93 |
| 5,396,559 A * | 3/1995 | McGrew ...................... 380/54 |
| 5,708,717 A | 1/1998 | Alasia ......................... 380/51 |
| 5,784,200 A | 7/1998 | Modegi ...................... 359/567 |
| 5,986,781 A | 11/1999 | Long ........................... 359/30 |
| 5,999,280 A | 12/1999 | Huang .......................... 359/2 |
| 6,000,728 A | 12/1999 | Mowry, Jr. et al. ........... 283/93 |
| 6,222,650 B1 | 4/2001 | Long ............................ 359/2 |
| 6,226,109 B1 | 5/2001 | Tompkin et al. .............. 359/2 |
| 6,552,830 B2 | 4/2003 | Long ............................ 359/2 |

* cited by examiner

*Primary Examiner*—Thong Nguyen
*Assistant Examiner*—Arnel C. Lavarias
(74) *Attorney, Agent, or Firm*—Dorsey & Whitney LLP; R. Michael Ananian

(57) ABSTRACT

Holographic and diffractive security devices and documents carrying security devices as well as system, apparatus, and method for making and using security devices. Security devices provide at least one type of security feature in form of secret, hidden, or covert security feature, not visible to a normal unaided human eye. Covert security features may be any graphic or symbolic representation. One or multiple security features may be provided on any single security device in any combination. Covert feature is revealed either when a decoder device is used with the security device, or when the security device is oriented and viewed in predetermined manner. Embodiments may provide a second overt or non-covert security device in the form of a diffractive or holographic image or graphic that is visible to the unaided eye without use of any decoder or special viewing conditions.

108 Claims, 17 Drawing Sheets

IMAGE HIDDEN IN FIELD (NOT TO SCALE)

IMAGE HIDDEN IN FIELD

DECODER SCREEN

IMAGE REVEALED BY DECODER

IMAGE HIDDEN IN FIELD

FIG. 4a(1)
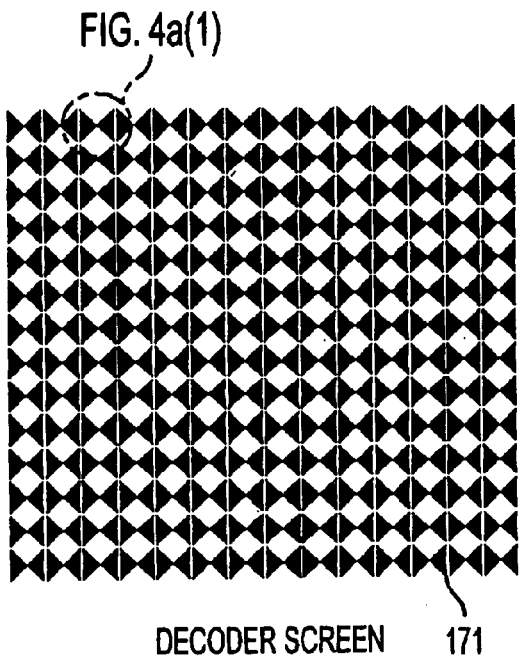
DECODER SCREEN 171
FIG. 4(a)
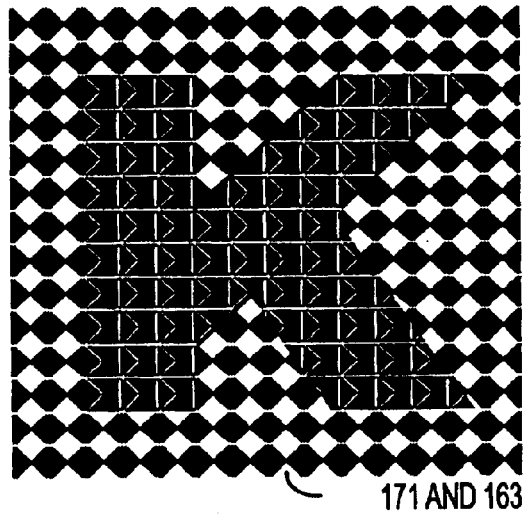
171 AND 163
IMAGE REVEALED BY DECODER
FIG. 4(b)
FIG. 4a(1)
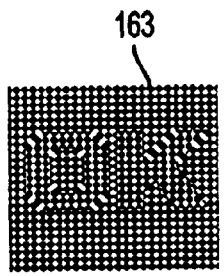
163
IMAGE HIDDEN IN FIELD
FIG. 4(c)
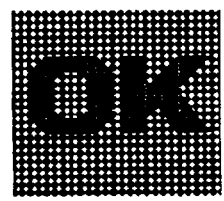
IMAGE REVEALED BY DECODER
FIG. 4(d)

FIG. 5a(1)
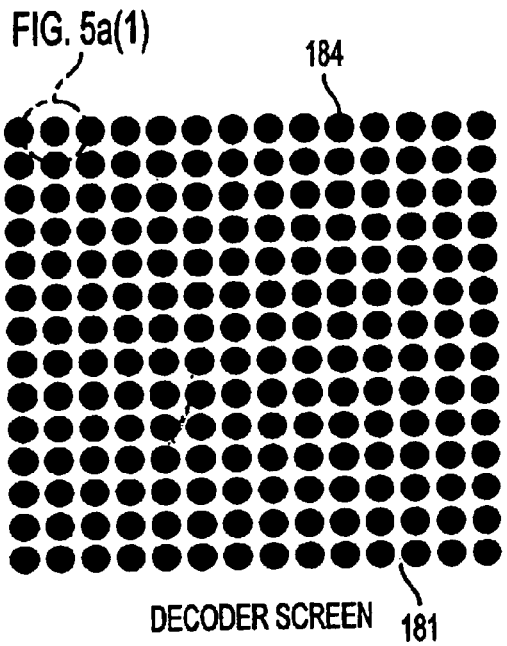
DECODER SCREEN 181
FIG. 5(a)
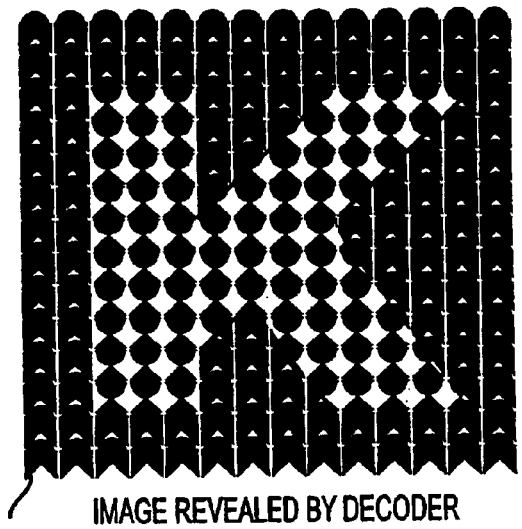
IMAGE REVEALED BY DECODER
181 AND 163   FIG. 5(b)
FIG. 5a(1)
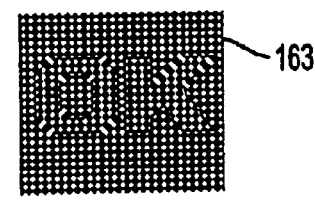
IMAGE HIDDEN IN FIELD
FIG. 5(c)
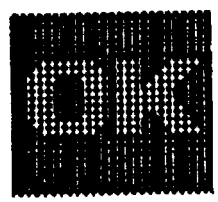
IMAGE REVEALED BY DECODER
FIG. 5(d)

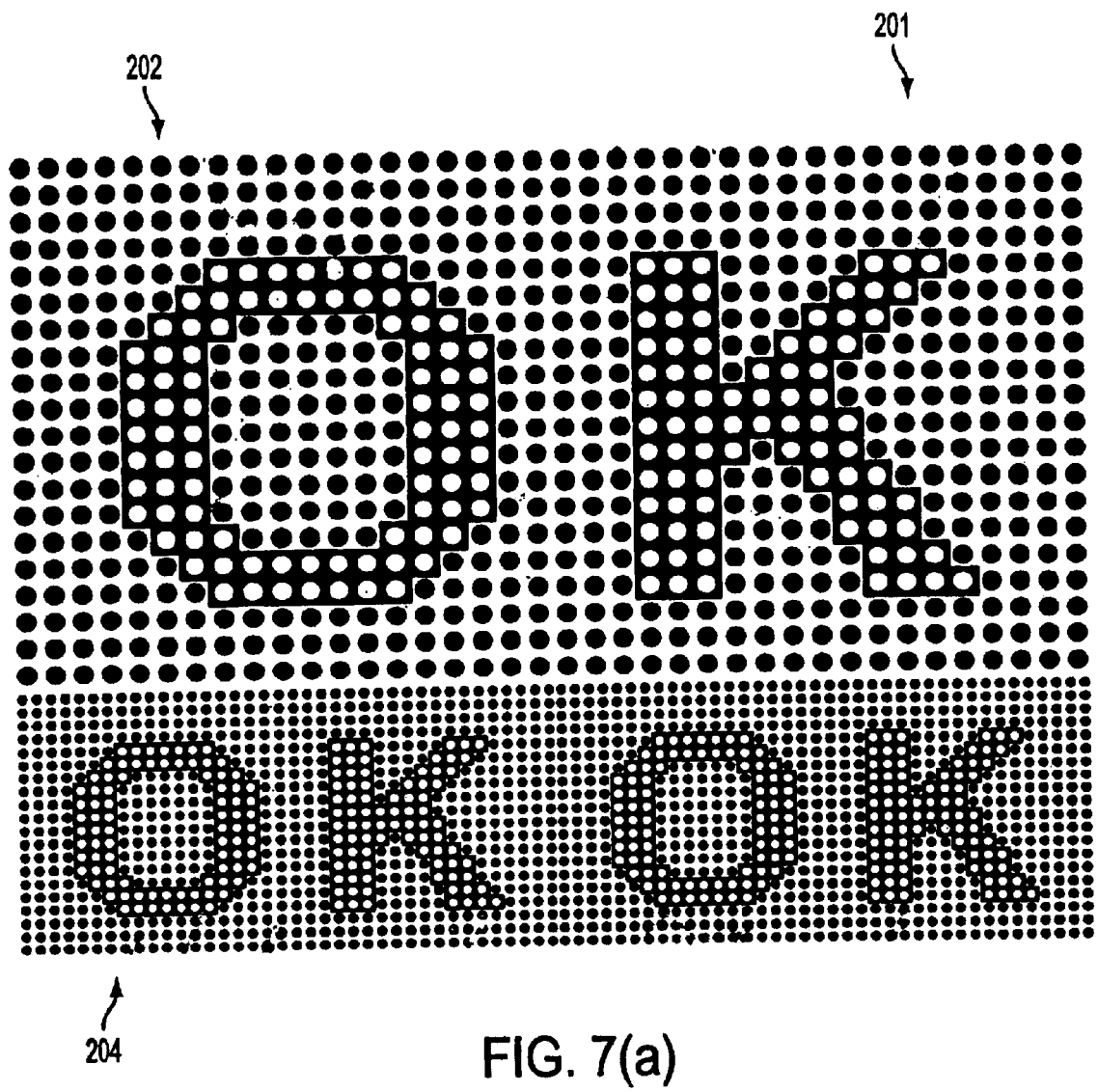
FIG. 7(b)
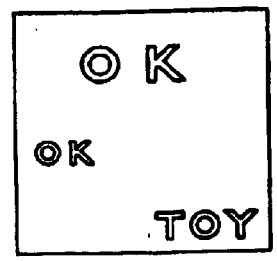 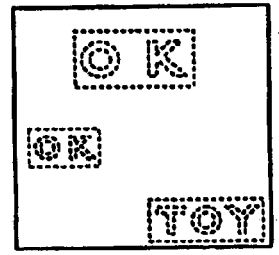
FIG. 7(a)
FIG. 7(c)

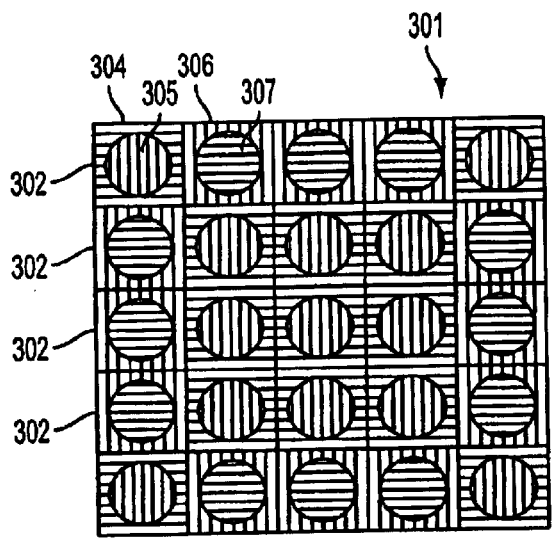

CELL ARRAY SHOWING DIFFRACTIVE AND
MODULATED-DIFFRACTIVE AREAS WITHIN THE CELLS

FIG. 9(a)

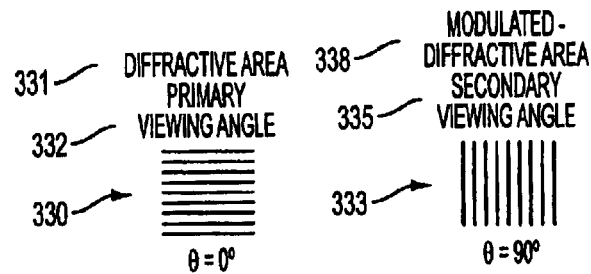

FIG. 9(b)    FIG. 9(c)

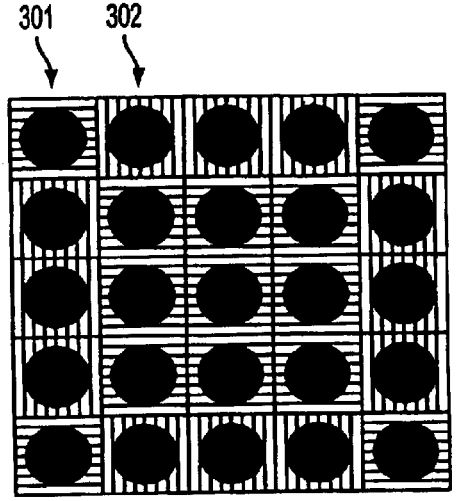

THE SAME CELL BEING DECODED BY A REGULAR SCREEN
WITH CORRESPONDING DOT SHAPE AND SCREEN FREQUENCY

FIG. 9(d)

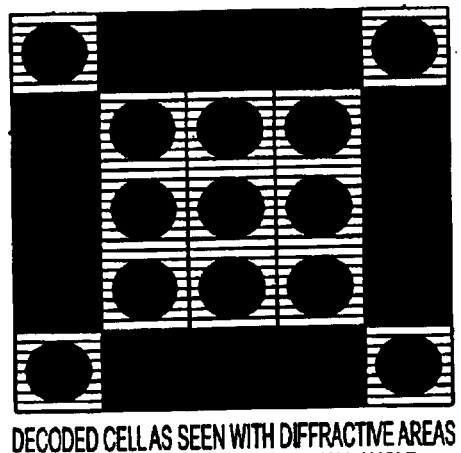

DECODED CELL AS SEEN WITH DIFFRACTIVE AREAS
ILLUMINATED AT PRIMARY VIEWING ANGLE

FIG. 9(e)

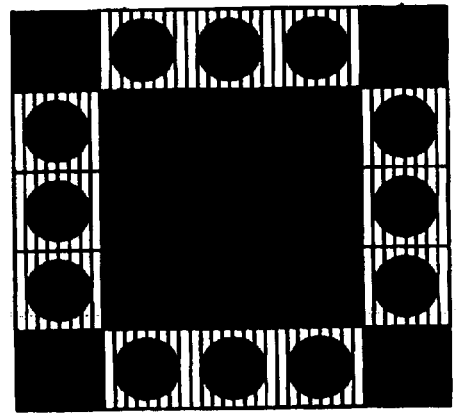

DECODED CELL AS SEEN WITH MODULATED-DIFFRACTIVE
AREAS ILLUMINATED AT SECONDARY VIEWING ANGLE

FIG. 9(f)

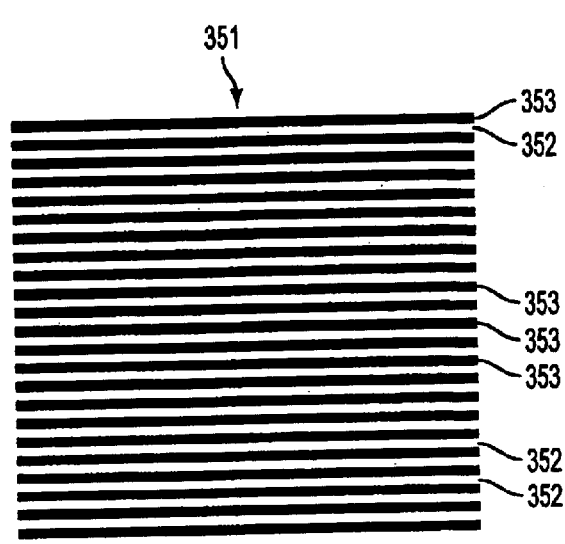
UNENCODED IMAGE AREA
FIG. 10(a)
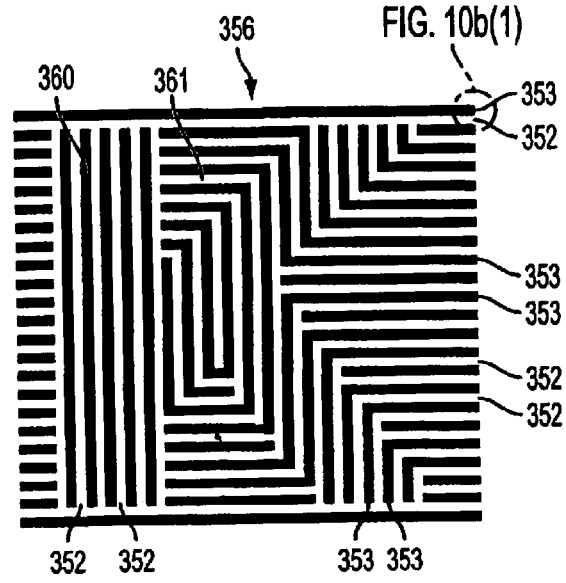
ENCODED IMAGE AREA
FIG. 10(b)
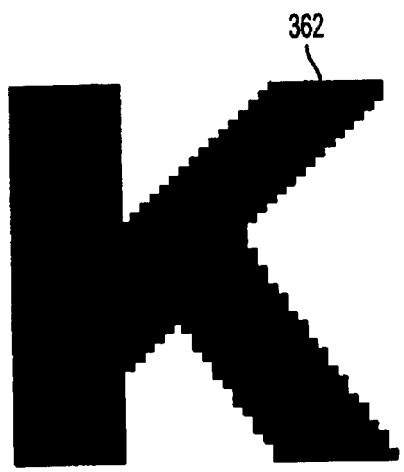
COVERT IMAGE
FIG. 10(c)
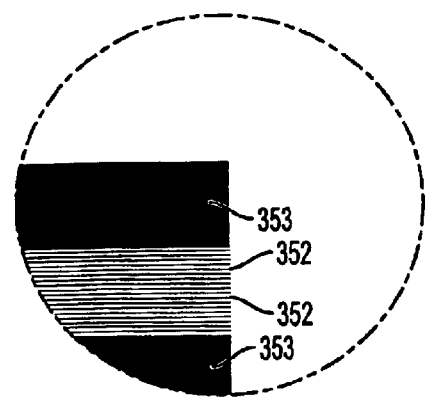
FIG. 10b(1)

COMPONENT A

COMPONENT B

COMBINED COMPONENTS

COMBINED COMPONENTS

IMAGE AND FIELD CELLS
COMPONENT A

IMAGE AND FIELD CELLS
COMPONENT B

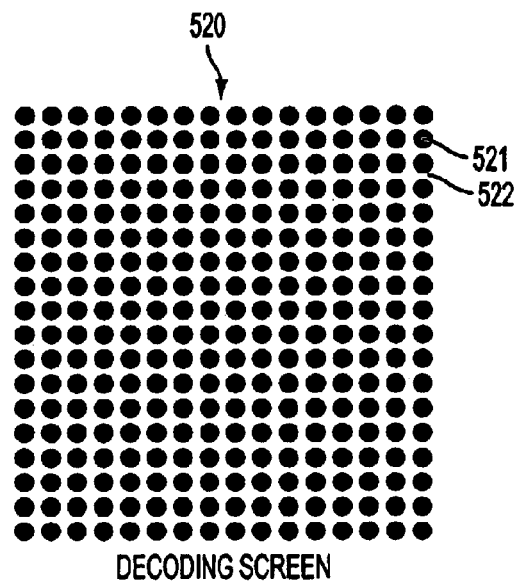
FIG. 11(g)
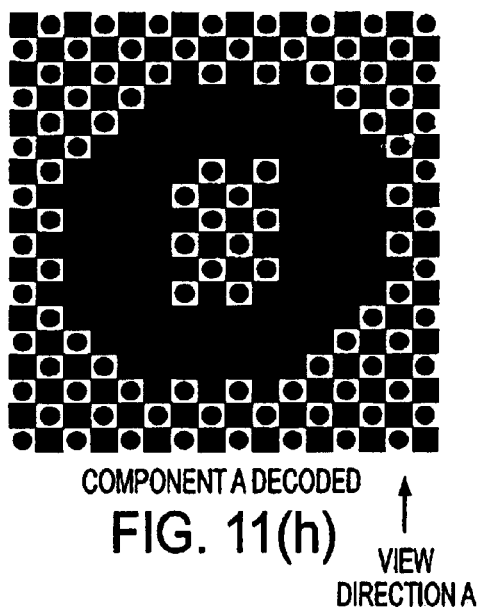
COMPONENT A DECODED
FIG. 11(h) VIEW DIRECTION A
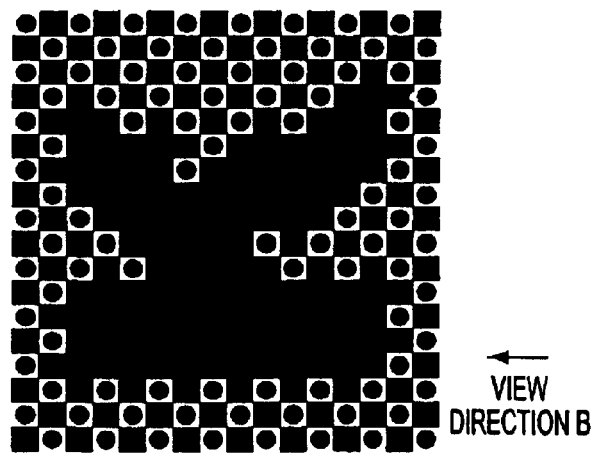
COMPONENT B DECODED
FIG. 11(i) VIEW DIRECTION B

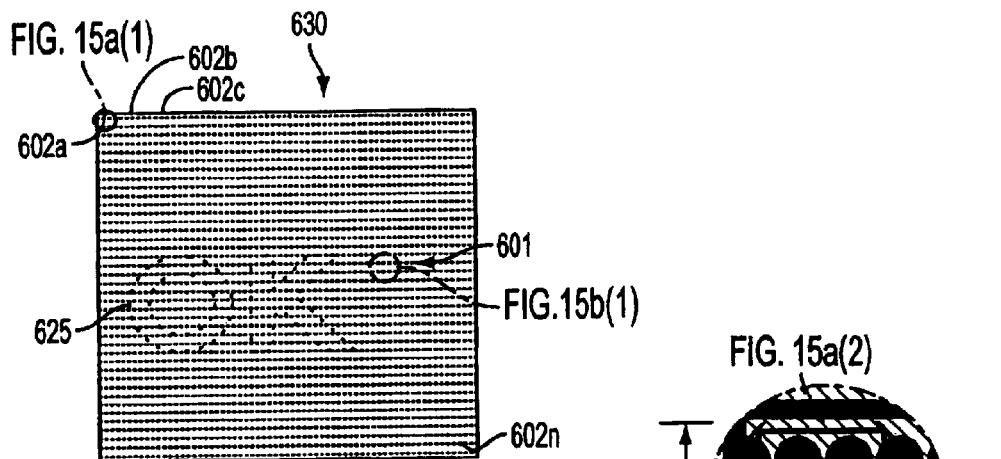
FIG. 15a
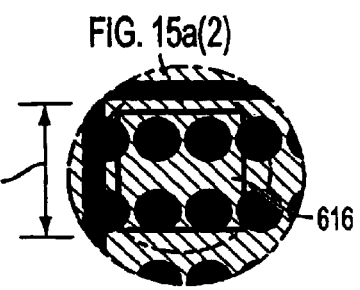
FIG. 15a(1)
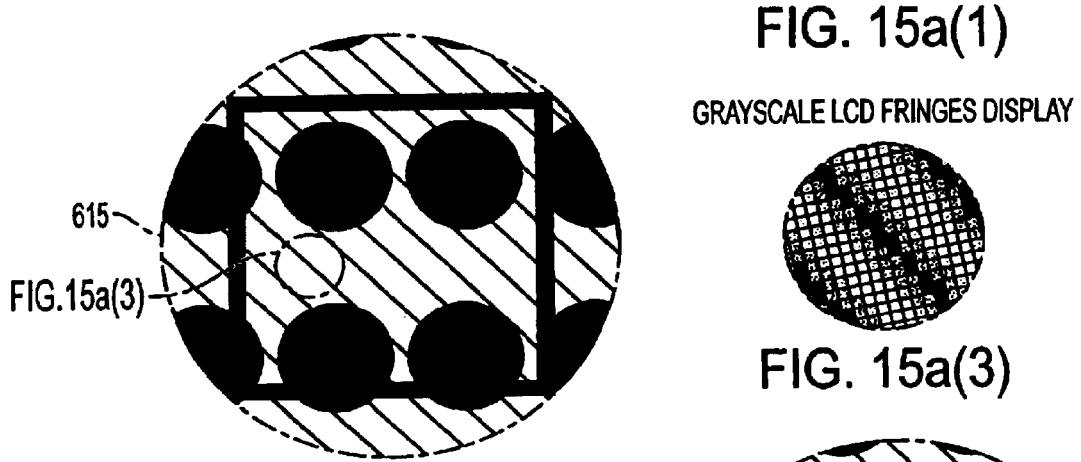
FIG. 15a(2)
GRAYSCALE LCD FRINGES DISPLAY
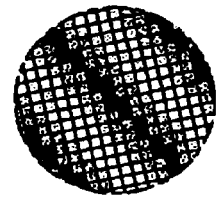
FIG. 15a(3)
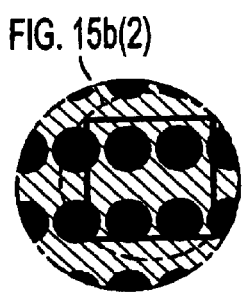
FIG. 15b(1)
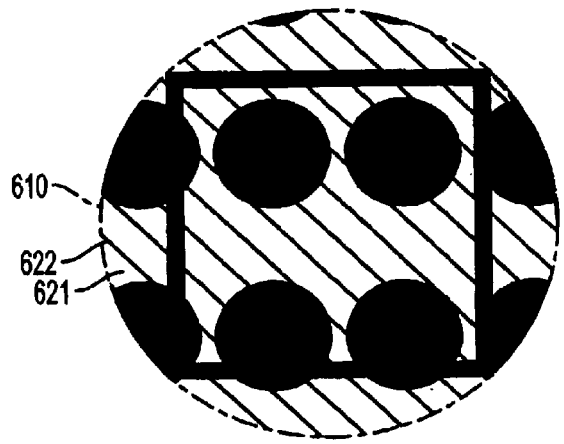
FIG. 15b(2)

SYSTEM AND METHOD FOR ENCODING AND DECODING AN IMAGE OR DOCUMENT AND DOCUMENT ENCODED THEREBY

RELATED APPLICATIONS

The benefit of priority under 35 U.S.C. 119(e) is claimed to U.S. Provisional Patent Application Ser. No. 60/310,749 filed 07 Aug. 2001 entitled System And Method For Encoding An Image And Document Encoded Thereby; which application is hereby incorporated by reference.

U.S. Pat. No. 5,986,781 issued 16 Nov. 1999 and entitled Apparatus And Method For Generating Diffractive Element Using Liquid Crystal Display; and U.S. Pat. No. 6,222,650 issued 24 Apr. 2001 and entitled Holographic Authentication Element And Document Having Holographic Authentication Element Formed Thereon; and U.S. patent application Ser. No. 09/802,714 filed Mar. 8, 2001 entitled Holographic Authentication Element; are related applications each of which patent and patent application is herein incorporated by reference.

FIELD OF THE INVENTION

This invention pertains generally to the field of holographic security devices and documents carrying such security devices as well as to systems and methods for making and using such security devices; and more particularly to holographic security devices that provide a holographic pictorial security image that is visible at all times and a separate security covert image that is viewable only by using a decoder or by viewing under other prescribed viewing conditions.

BACKGROUND

Heretofore, various techniques have been used to form or attempt to form secret or covert or secret images. Unfortunately, as copying and reproduction technologies (such as scanners and printers and computer software for generating images and documents) improve and become available at much lower costs, the security associated with the use of such conventional covert or secret images has come into question.

Some of these techniques have been intended for use with a decoding screen which would reveal a validation message, image, or graphic, while other techniques were intended to render an invalidation message visible when the printed image was photocopied. The later technique for example being commonly used on bank checks.

Some of these techniques relied on ink-based printing and reproduction technologies. Other of these techniques relied on lenticular screens or fly's eye lenses to scramble an image and later reconstruct it. For example, the following United States patents pertain to some techniques for generating or rendering secret messages: U.S. Pat. No. 3,178,993, U.S. Pat. No. 3,524,395, U.S. Pat. No. 3,676,000, U.S. Pat. No. 3,894,756, and U.S. Pat. No. 3,937,565.

Another technique relies on software to initially scramble an image, such as the technique described in U.S. Pat. No. 5,708,717.

Another technique (such as described in U.S. Pat. No. 3,675,948 or U.S. Pat. No. 3,784,289) uses a halftone screen of constant density in which the image area has a shifted angle from the surround area, and uses another constant halftone film of the same frequency as a decoder. Examples of techniques of this type are described in U.S. Pat. No. 3,675,948 or U.S. Pat. No. 3,784,289.

Other related techniques shift the screen frequency in the image areas rather than the screen angle. Examples of this technique are described for example in U.S. Pat. No. 5,197,765 and U.S. Pat. No. 6,000,728.

Another known technique relies on a complex or random binary "code plate" to encode and decode the image. Examples of this technique are described for example in U.S. Pat. No. 3,914,877 and U.S. Pat. No. 4,586,711. A similar technique uses a reference pattern of dots in an apparently random pattern and shifts the dots in the image areas according to the density of the image at that location.

Other approaches have attempted to provide security devices having higher-and-higher resolution in attempt to thwart counterfeiting however, these security techniques and devices are problematic at least in that wet ink or dye based printing techniques have not been able to achieve the resolution or spatial frequency content desired to provide the desired security device features or the desired level of security.

Although these techniques have attempted to provide some measure of secrecy or covertness, they have not been completely successful and therefore problems and limitations remain with such conventional techniques, the security devices produced by such techniques, and the security mechanism or method provided by such techniques.

Therefore, there remains a need for system, method, and device for validating the identity of genuine items whether documents or goods and for identifying counterfeit items on a large scale and desirably at a low per-item cost.

SUMMARY

Embodiments of the invention provide security devices and documents carrying such security devices as well as a system, apparatus, and method for making and using such security devices. The security devices provide at least one type of security feature in the form of a secret, hidden, or covert security feature, not visible to a normal unaided human eye. Exemplary covert security features may for example be a text letter, word, or phrase, an image, a graphic or logo, or any other graphic or symbolic representation. One or multiple ones of these security features may be provided on any single security device in any combination. For some security devices, the covert feature is revealed either when a decoder device is used with the security device, or when the security device is oriented and viewed in predetermined manner. While embodiments of the security devices include at least the one covert security feature, other embodiments provide a second overt or non-covert security device in the form of a diffractive or holographic image or graphic that is visible to the unaided eye without use of any decoder or special viewing conditions. This overt image may be any image, such as a constant color or gray-tone image, a texture image, a pictorial scene, a graphic, a two-dimensional array of symbols or text, or any other depiction. The combination of the covert and overt security features provides greater security than either alone and possess characteristics that cannot be readily counterfeited.

In one embodiment, the invention provides a security device including: a pattern formed from an array of cells and displaying an unencoded component visible to the unaided eye of a viewer and an encoded component not readily discernable to the unaided eye of a viewer. The pattern is comprised of (i) diffractive regions and non-diffractive regions, or (ii) diffractive regions and modulated-diffractive regions such that the diffractive regions and modulated-diffractive regions can be selectively illuminated by an external illumination source at different angles and be made independently visible to the viewer, or (iii) diffractive regions and a combination of non-diffractive regions and modulated diffractive regions. Each cell being small enough to be not readily discernable to the unaided eye of a human viewer; and each cell having at least one diffractive region and at least one non-diffractive or modulated-diffractive region, the ratio of the area of the diffractive region to the area of the non-diffractive or modulated-diffractive region in each encoded or uuencoded cell being substantially identical. The encoded component is not visible to an unaided eye being encoded into the synthesized pattern by substantially reversing the contrast of each cell forming a portion of the encoded component to change diffractive portions to non-diffractive or modulated-diffractive portions, and to change non-diffractive or modulated-diffractive portions to diffractive portions, the brightness within each cell remaining substantially unchanged as a result of the contrast reversal by maintaining a substantially constant ratio between the diffractive area to the non-diffractive or modulated-diffractive areas in the encoded and uuencoded cells; and the encoded component not readily visible to an unaided eye of the viewer being rendered visible to the unaided eye of the viewer when viewed through an external decoding device.

Other embodiments of the invention provide apparatus and system for making the security devices, documents or other objects and items carrying the security devices, methods and apparatus for decoding the security devices, as well as other aspects described in greater detail in the detailed description.

BRIEF DESCRIPTION OF THE DRAWINGS

FIGS. 4a–d are diagrammatic illustrations showing aspects of a third embodiment of a form of the invention using non-circular dots or symbols in a regular array and more particularly showing an embodiment of a decoder screen having a (rotated) square or diamond shaped pattern and the image revealed by that decoder.

FIGS. 5a–d are diagrammatic illustrations showing aspects of a third embodiment of a form of the invention using non-circular dots or symbols in a regular array and more particularly showing an embodiment of a decoder screen having a round dot shaped pattern and the image revealed by that decoder.

FIGS. 7a–c are diagrammatic illustrations showing an embodiment of a security device showing two different resolutions or size spacing.

FIGS. 9a–f are diagrammatic illustrations showing an embodiment of a security device showing encoding using diffractive and modulated-diffractive regions in the cells.

FIGS. 10a–c are diagrammatic illustrations showing an embodiment of a security device showing complex low-frequency grating structure visible in or near zero order.

FIGS. 11a–i are diagrammatic illustrations showing another embodiment of a security device providing multiple covert images separated by direction.

FIGS. 15a–b is a diagrammatic illustration showing an embodiment a recorded composite image for generating a high-resolution pattern to generate security devices.

DETAILED DESCRIPTION OF EMBODIMENTS OF THE INVENTION

Various embodiments of the invention are now described relative to the drawings. While each embodiment may for example provide a security device having different structure or method for encoding and decoding the security related image or document, each of the embodiments may provide one or more of a security device having or carrying an encoded covert or substantially covert image, a decoding device for decoding the encoded image, a security system including a security device and a decoder device, and methods and apparatus for making and using the security device, decoding device, and security system. They each also provide business method or model for doing business.

Figure 1A:
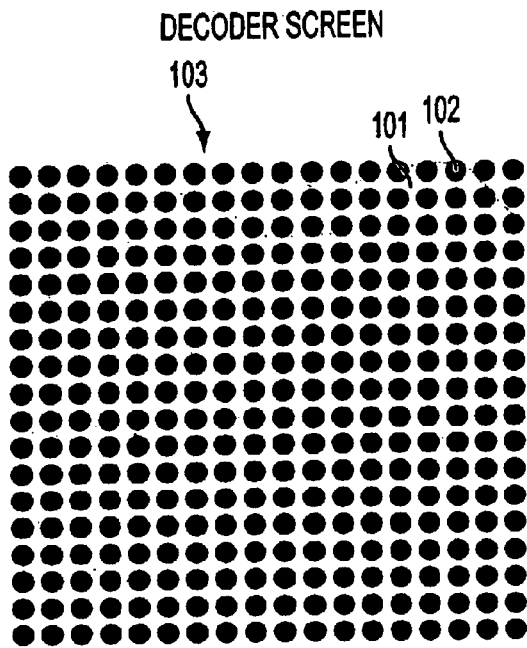
FIGS. 1a–f are diagrammatic illustrations showing aspects of a first embodiment of a form of the invention using displacement of dots forming image.

With reference to FIG. 1A, there is illustrated an embodiment of a decoder screen 103 shown comprised of a regular two-dimensional array of a plurality of round black or opaque dots 102 on a clear or transparent background field 101. The dots 102 may for example be opaque dots generated by any direct writing, ink printing, or the like and will generally be devoid of any diffractive or holographic content (compare to the clear or transparent areas of the image screen described hereinafter which include diffractive and/or holographic content). When placed over the image screen 104, these decoder device 103 dots 102 act to block light that would otherwise emanate from the image screen 104 whereas the clear area or areas 101 acts to allow light emanating from the image screen 104 to pass. The plurality of dots in the decoder screen each have a dot shape, a dot size, a dot array or screen angle, and a dot spacing distance (d) 116 typically defined as a dot center-to-center linear distance and alternatively defined as a screen frequency either in dots/unit-length (e. g. 400 dots/inch), lines/unit-length (e.g. 50 lines/mm), line-pairs/unit-length (e.g. 25 line-pairs/inch), or spatial frequency. It will be appreciated that the term "dots" is used in a general sense to mean shapes, patches, symbols, or the like of any shape including but not limited to round circles, elliptical patches, squares, rectangles, hexagons, diamonds, other regular or irregular polygons, and the like. Where the dot does not have a symmetrical shape there may additionally be a dot orientation or angle 117 which is different from the a dot array or screen angle 115.

Figure 1B:
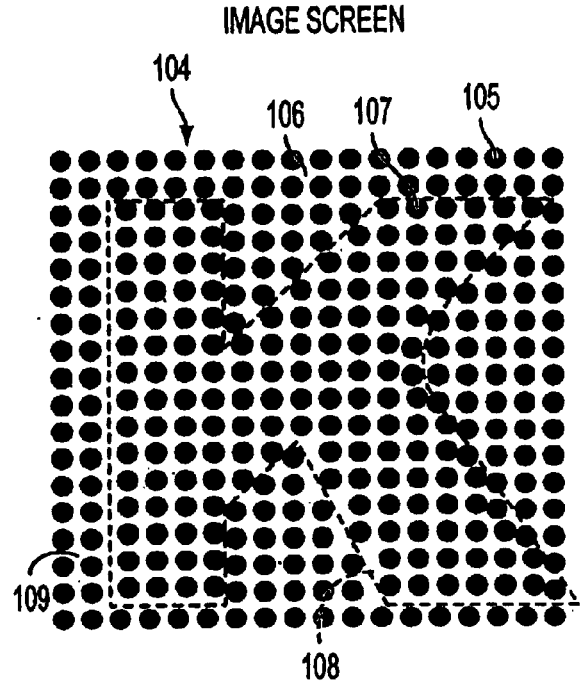
Figure 1C:
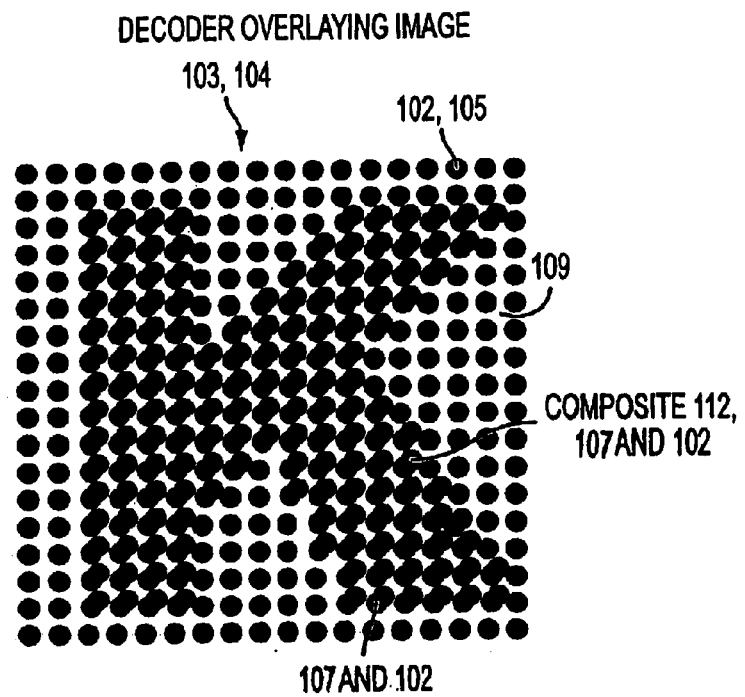
Figure 1D:
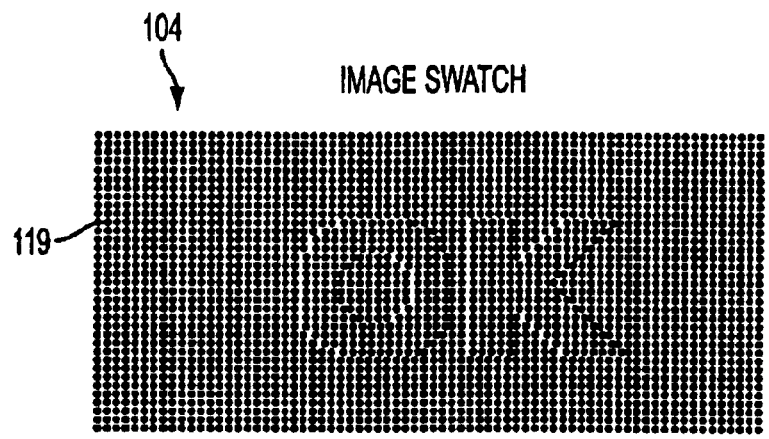
Figure 1E:
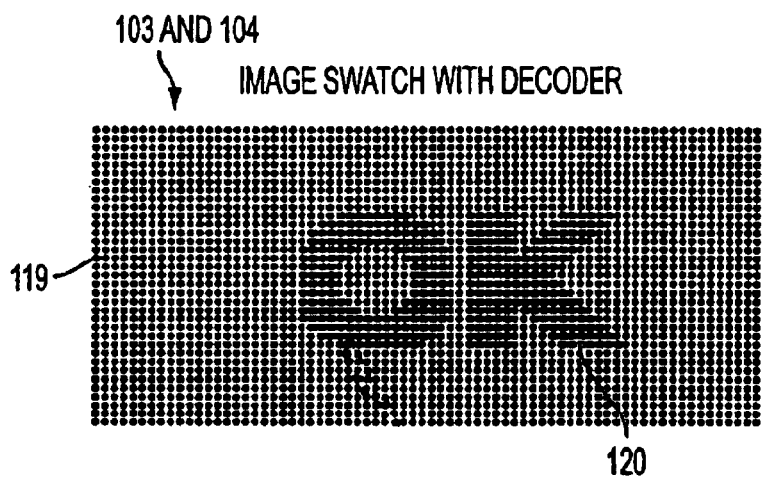

FIG. 1B shows an embodiment of an image screen 104 having at least one security image or message portion 108 (in this example showing an encoded letter "K" from the complete image "OK" of FIG. 1E) and a non-security-image or non-message portion 109. The non-security-image portion comprises a regular two-dimensional array arranged in rows and columns of a plurality of round void of diffractive lines or non-diffractive areas (or modulated-diffractive) dots 105 on a diffractive or holographic background field 106. For example, in metalized Mylar they are plain silver foil and the white areas have microscopic diffraction ridges etched into them. These ridges are not shown since they are so small relative to the security feature. The modulated-diffractive features are different diffractive features that are described in greater detail elsewhere in this description; however, in somewhat simplified terms a diffractive grating structure different from that used for the image may be used in place of a non-diffractive structure so that rather than blocking a component of light the amount or character of that light directed to the viewer is changed. The change may be accomplished by rotating the same frequency grating so that the light is directed in a direction away from the viewer when the light reconstructing the hologram is directed to the viewer, or by attenuating the amount of light reaching the viewer. Techniques for accomplishing the change or modulation are described elsewhere in this description.

The diffractive or holographic background field may advantageously have structure for generating a holographic image different from the security image when viewed with light to reconstruct the hologram encoded in the diffractive area 106. Of course the background image itself may generally comprise a security feature in which case the security image represents a second security feature. The security image when decoded will appear within, on, or behind, the holographic image. For example, the background holographic image may comprise a picture, a corporate logo, a bank logo or symbol, or any other image, graphic, text or other representation or depiction having diffractive or holographic features as are known in the art. It may for example be a picture of an eagle, a car, an airplane, a pattern of symbols or text, or a combination of picture and symbols. Thus, the background portion may be a simple diffractive grating but more advantageously has more complicated pattern of different diffractive elements storing holographic information and adapted for reproducing the holographic information when illuminated.

The background holographic image may be recorded or stored using various techniques, including for example but not limited to the techniques described in U.S. Pat. No. 5,986,781 issued 16 Nov. 1999 and entitled Apparatus And Method For Generating Diffractive Element Using Liquid Crystal Display; U.S. Pat. No. 6,222,650 issued 24 Apr. 2001 and entitled Holographic Authentication Element And Document Having Holographic Authentication Element Formed Thereon; and copending U.S. patent application Ser. No. 09/802,714 filed Mar. 8, 2001 entitled Holographic Authentication Element; each of which patent and patent application is herein incorporated by reference. In order to simplify the nomenclature used herein the term "background image", "background hologram", or the like will generally be used here to describe the diffractive or holographic image generated by diffractive elements of the image screen 109 (or the similar structures in other embodiments of the invention described hereinafter). The component of the security feature encoded by the non-diffractive components, such as dots 107 that are shifted relative to the regular array in the image screen 104 are generally referred to as the image portion 108. The non-diffractive components, such as dots 105 that are part of the unshifted regular array in the image screen 104 are generally referred to as the non-image portion 108.

When the image screen is generated on a foil material, the image component dots 107 and the non-image component dots 105 would for example be generated as solid foil areas without any diffractive internal structure.

The plurality of dots 105 in the non-image portion 109 of the image screen 104 each have a dot shape, a dot size, a dot array or screen angle, and a dot spacing distance or frequency analogous to the decoder screen 103 and these features should desirably match, substantially match, or be in some predetermined size, shape, and spacing relationship with those of the decoder screen 102. In one embodiment, the dot shape, dot size, dot spacing or frequency (except for the image portion 108), dot array or screen angle, are the same in the decoder screen 103 and the image screen 104 to provide optimum decoding. It will however be appreciated that while the dot spacing distance or screen frequency should advantageously be kept the same or close to the same for the image screen and the decoding screen, some variation in dot size and dot shape may be tolerated. For example a round dot decoder screen may be used to decode an encoded image having square dots that are some amount larger or smaller than the round decoder dots.

The plurality of dots 107 in the image portion 108 of the image screen 104 are shifted or displaced from the regular array of the non-image portion 109 but have the same dot shape, dot size, dot spacing or frequency, and dot array or screen angle, as the non-image carrying portion 109 of the image screen 104. In this example, the image portion 108 dots 107 are displaced about ½ of the dot spacing interval. In general, the screen dots 105 in the image areas 108 of the image screen 104 are shifted by some fraction of the screen frequency or screen dot spacing as compared to the non-image areas 109 of the image screen 104. This technique may render more covert images if the shifting of the image area dots 105 is variable and corresponds to the distance of the dot from the border of the image/background border 110 to reduce edge or boundary effects, and less covert images when the dots are closer to the border.

In the highly magnified diagrammatic representation of FIG. 1B, the shift or displacement between dots of the image portion 108 and the non-image portions 109 of the image screen is visible but would not be visible or only visible with great difficulty and scrutiny at normal viewing distances by the unaided or naked eye of a human viewer. At normal screen dot sizes (such as for example a screen having more than about 72 dots per inch (one common printing standard) the individual dots in any of the decoder or image screens is below the visual acuity of normal human viewers and only the average gray level of the dots and background are perceived. By comparison, the larger composite or aggregate security feature (such as the connected image screen dots 107 and decoder screen dots 102 forming the "K" of "OK" 120) that spans a greater area and has a darker average gray level than the background is visible to the unaided eye under the same conditions.

FIG. 1C is a diagrammatic illustration showing the decoder screen 103 overlying the image screen 104 in registration so that the decoder screen dots 102 align with the non-image portion image screen dots 105. This forms a composite in which the image screen image portion dots 107 overlay some of the decoder screen dots 102 out of registration and as a result of the aggregation generate a larger and darker feature the "K" of the "OK" 120 security feature. In one embodiment, the decoder screen 103 may be a conventional half-tone screen as used in the printing and publication industry having dot size, dot shape, and dot spacing or frequency corresponding to the inventive image screen 105. It is noted that for such conventional half-tone screens the dot size may be related to the lightness, darkness, density, percentage, or other manner of identifying the screen, where a larger spot size corresponds to higher percentage or density given a fixed dot spacing.

FIG. 1D shows a diagrammatic depiction of the "OK" security feature of the image screen 104 at a lower magnification than in FIG. 1B however it is still magnified and may not show the actual appearance as a result of the patent publication process. FIG. 1E shows a diagrammatic depiction of the "OK" security feature of the image screen 104 of FIG. 1D viewed through the decoder screen 103 clearly making it much more visible than in FIG. 1D. It will be noted that advantageously, the image screen image portion 108 dots 107 will be adjusted at its edges or boundaries to reduce or eliminate boundary effects and undesired aggregation or overlap of image portions with non-image portions in the image screen. These edge overlaps may cause some visibility at the edges of the security feature. As described in greater detail elsewhere in this description, the adjustments may take the form of modifying the amount of displacement at or near the boundaries so that there is a gradual or smooth transition between the non-image dots and the image dots without large gaps or intersecting dots.

Although the "OK" security feature depicted in FIG. 1D and FIG. 1E appear to show a plain or non-diffractive or non-holographic background, it will be appreciated that the "OK" or any other security feature will appear over, behind, or within a holographic background (or foreground) image 119. Simple diffractive patterns for a diffractive or holographic background such as would show a change in color as it is rotated are not readily shown on a black and white printed page.

Figure 1F:
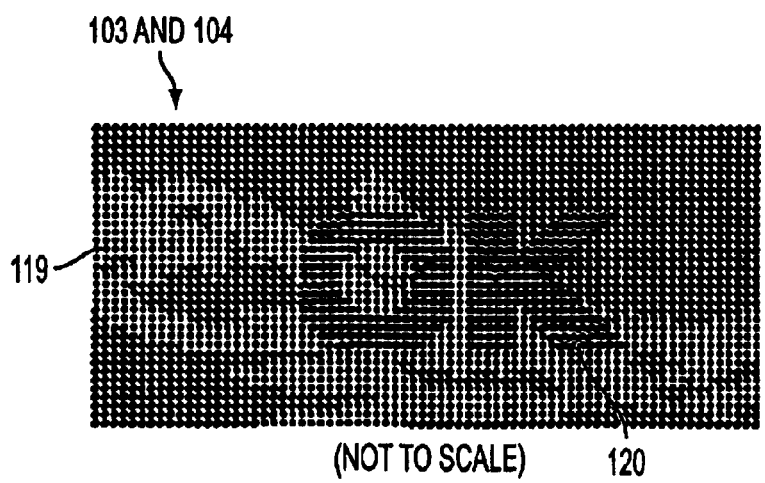

An exemplary embodiment of the combination of the decoded security feature 120 "OK" and a background holographic image 119 is illustrated in FIG. 1F. Limitations of the printing process limit the fidelity with which this can be represented. For example, the dots in the image and decoder screen are depicted at a larger size than they would actually be so that they can be reproduced in this printed document and this results in the visual appearance of the dot pattern on top of the background image and darkening or that background image. The degradation visible in the drawing would not normally occur or be visible in an actual security device.

In this embodiment, an image or graphic depiction 108 is encoded on an image carrying device usually a screen 104 as a two dimensional array of dots, symbols, spots, or other regions 105, 107 that differ from the background 106. The encoding of the image is accomplished by shifting the image portion 108 relative to the non-image portion 109. Typically this two dimensional array may be an array of half-tone round or circular dots 107 having a regular center-to-center spacing (for example, a 200 dot/inch screen) but they may be of different shape, and the encoded image 108 represents a shift or displacement of dots 105 from the otherwise regular dot array 107. In this embodiment, dots 107 may generally have the same characteristics as dots 105 except for the shift or displacement. The dots (or other pattern shape) may advantageously be sized so that they are between about 50% and about 100% of the regular screen dot spacing, and more desirably between about 70% and about 90% of the regular screen dot spacing to provide maximum visibility during decoding, as further described below. Typically, a shift or displacement of one-half the dot spacing will provide the best visibility when the image is decoded; however, it will be appreciated that other shifts will provide acceptable visibility. The shift may be vertical, horizontal, or at any other angle. For example a shift of between one-quarter and three-quarters of the normal regular dot spacing will also decode the image, and that other shifts greater than zero and less than one dot spacing may also provide acceptable degrees of visibility that will depend upon the application. Of course the shift is modulo the dot spacing due to the repetitive nature of the screen as a shift of for example, between one and two dot spacing provides the same result as a shift between zero and one dot spacing. A decoder screen having the same dot shape, size, and spacing is used to decode the encoded image by overlying the decoder screen onto the image screen. The covert image is revealed by the overlaid decoding screen as a result of: (i) the substantially exact alignment of the regular array of dots in the decoder screen with the regular array (without shift) of same sized dots in the non-image portion of the image screen that preserves each dot as a discreet and unconnected dot in a background field around each dot, (ii) the misalignment of the regular array of dots in the decoder screen with the shifted array of same sized dots in the image portion of the image screen that depending upon the dot size and shift results in increased dot density or dot frequency in the image portion (with small dot size) or with multiple dot aggregation that results in larger patches of aggregated dots (with larger sized dots) and typically a continuous or connected set of dots that reveal the image in a field of discontinuous or separated dots. It will also be appreciated that reversing these conditions by aligning the shifted dots with the decoding screen also decodes the image but with reversed contrast. Recall that this secret or covert image may generally be in addition to the background diffractive or holographic image 119 that remains visible through the transparent portion of an overlaid decoder screen.

In one embodiment, the magnitude (and optionally the angle) of the shift of the dots in at the edge or border regions of the image portion of the image screen is modified from that in other regions of the image portion to reduce the possible visibility of the encoded image portion within the image screen that might result from the discontinuous dot spacing at the border between the image portion and the non-image portion. For example, if the image portion of the image screen provides for a one-half normal dot spacing horizontal shift to the right, the shift for the first or left-most column of image dots may be one-quarter to the right and the second column may be one-half to the right, and similarly the shift for the last or right-most column of image dots may be only one-quarter of the shift to the right. More advantageously the adjustment in the amount of shift may be adjusted over a plurality of columns to provide a smooth transition and reduce the possibility of visibility of the covert image portion as a result of edge or boundary effects.

In another embodiment, the size of the dots may be modified at one or multiple boundaries. In another embodiment, some dots may be eliminated (not printed or not imaged) when it appears that the shifted dots will cause an undesired aggregations, boundary line, or other artifact that may cause some visibility of the encoded image without the decoder. The types of adjustments may be selected based on the feature size of the image portion since there may generally be more adjustment options available for a image feature made up of a large number of dots than by a feature made up of a small number of dots.

In an alternative embodiment now described relative to the diagrammatic illustrations of FIG. 2, both the decoder screen 138 and the image screen 134 maintain a regular array (rather than displacing image portions of image screen out of the regular array) and provide different field screen cell characteristics and image screen cell characteristics.

In this embodiment of the structure and method, a regular and constant two-dimensional dot screen having a plurality of dots 132 is used as a decoder 133, and a different screen 134 is used for the encoded image having some common characteristics with the decoder screen 133 as well as some differences.

In one embodiment, the cell-to-cell spacing or distance (generally corresponding to the dot-to-dot spacing distance in the embodiment of FIG. 1) is the same in the image screen and in the decoder screen, the dot shape is the same in both, and the screen angle is the same in both; however, there are differences in the structure of the image screen.

Figure 2A:
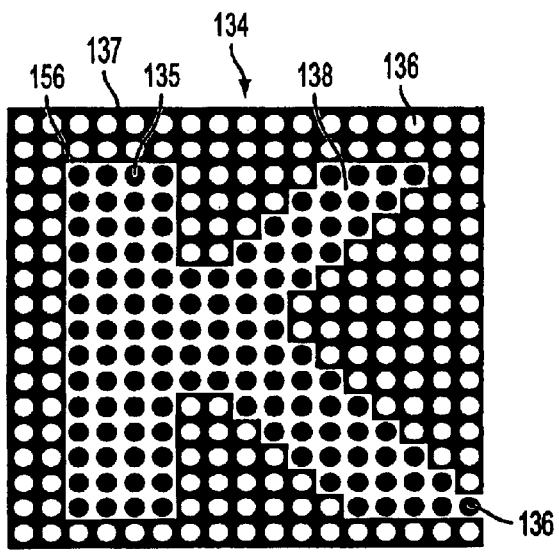
FIGS. 2a–h are diagrammatic illustrations showing aspects of a second embodiment of a form of the invention using dots in a regular array.
Figure 2B:
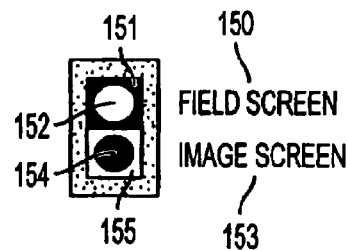

As in the embodiment of FIG. 1, the black areas (dots 135 and dot surrounds 137) in the image screen 134 represent non-diffractive areas (or in some embodiments modulated-diffractive areas) and the white areas (dots 136 and dot surrounds 138) represent diffractive areas, that is represent areas in which are recorded diffractive gratings or other diffractive elements or structures. These diffractive areas record and provide means for generating the background diffractive or holographic background image 119. With reference to FIG. 2G and FIG. 2H, the enlarged field screen cell 150 and image screen cell show the non-diffractive portion 151, 154 as a constant black opaque portion and the diffractive portions 152, 155 as having a plurality of lines representing the diffractive gratings. It will be appreciated that although a single cell of each type is illustrated having similar grating angle and frequency, in general either different portions of the image screen 134 will have different grating structure appropriate to recorded background hologram, or each (or selected ones of) the cells will store a more complex set of gratings so that the hologram may be reconstructed by any one cell.

It will be apparent that the field screen cells 150 and the image screen cells 153 are complementary in at least the sense that the portion containing the diffractive or non-diffractive component is reversed.

In one embodiment, the fraction or percentage of area covered in any cell by diffractive content versus non-diffractive content (or in some embodiments by modulated diffractive content) is 1:1, that is 50% of each cell is diffractive and 50% is not diffractive (or modulated-diffractive) so that there is no visible difference in the amount of light diffracted from any region of the image screen before decoding that would give a clue to the existence of the covert image. In other words, the covert image is not detectable from average gray-level or light value differences. However, so long as the ratio of diffractive to non-diffractive areas in both image and field cells are the same, the covert nature of the security image can be maintained so that the 1:1 ratio is not a requirement in this or the other embodiments described herein. On the other hand, once the image screen 134 is overlaid with the decoder screen 133, the opaque dots 132 (and non-diffractive areas) of the decoder screen cover up, mask, or block the diffractive areas in the centers 152 of the field screen 150 blocking any light that would be diffracted toward the eye of the viewer so that light diffracted by the combination of image screen cell 153 surround areas 155 is visible to the eye of the viewer revealing the letter "K" or other secret or covert text, image, graphic, or the like.

Figure 2C:
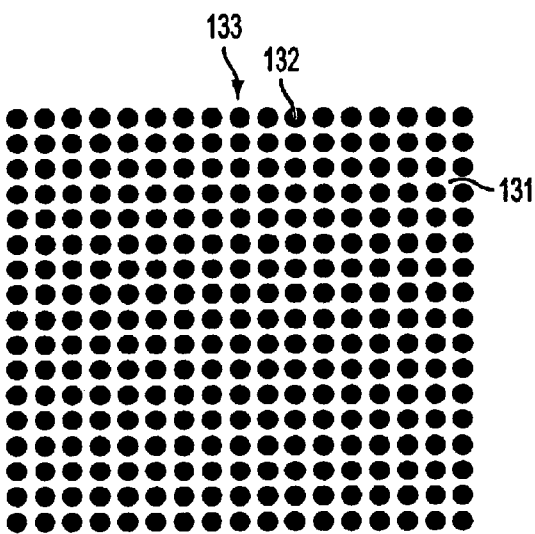

With reference to FIG. 2C, the decoder screen 133 may be of conventional design represented as a two-dimensional array of opaque dots, here shown as round or circular dots 132, but the dots may have any shape compatible with decoding the image screen. The white areas 131 surrounding the decoding screen dots 133 are transparent non-diffractive regions that permit light diffracted from diffractive regions 138 of the underlying image screen 134 to pass to the eye of the viewer. In general same size and shape dots 132 as the dots 152, 154 provide optimum decoding; however, decoding screens having the same screen frequency as the image screen but having dots with somewhat different size or shape may be utilized with some degradation of performance, such as loss of brightness or contrast of the background holographic image 119 and/or of the covert item relative to the background image 119.

It will be observed that the image screen 134 illustrated in FIG. 2A is of more complex design and structure than the structure illustrated and described relative to FIG. 1, owing to the presence of field screen cell types 150 and image screen cell types 153 as compared to the simple regular or displaced dots of the FIG. 1 embodiment. Field screen cells 150 and image screen cells 153 are illustrated in FIG. 2B against a mid-gray tone background 155 so that the light (diffractive) and dark (non-diffractive or modulated-diffractive) areas may be distinguished from the otherwise white paper background on which this patent is printed. No such mid-gray tone background 155 actually exists within the inventive structure or method.

Each of these field screen 150 and image screen 153 have a central portion 152, 154 and a surround portion 151, 155. In the illustrated embodiment, the outer boundary of the cells (and of the background surround portion) 150, 153 are square and the central portions 152, 154 are circular. It will be appreciated that the cells and central portion may have a variety of shapes so long as the cells are close-packed and fill the space. For example, uniform hexagonal cells or uniform rectangles may be used; and virtually any central portion shape may be used so long as the decoder has the corresponding shape or a shape sufficiently similar to provide an acceptable decoding quality. As it may be desirable to utilize conventional half-tone dot screen as the decoding screen, square cells and round central portion "dots" are advantageously utilized.

The need to provide well defined cell edges, sharp cell corners, well controlled areas of the central and surround portions, precludes generating cells of this type using conventional wet liquid or viscous ink or dye printing techniques. Wet liquid or viscous inks or dyes applied for example using conventional printing plates will tend to flow after applied and in general cannot be applied in a sufficiently precise and well controlled manner to permit high resolution or high screen frequency recording. For example, simply printing the non-diffractive regions of the image screen in opaque black ink on top of a diffractive or holographic screen would not generally be capable of maintaining the desired ratio of diffractive and non-diffractive regions. It will be appreciated that as the black areas grow the transparent areas of such an ink printed rendition would shrink so that there would only be one very specific set of printing parameters that would provide the intended characteristics. Typically, printing processes may not be controlled this precisely especially when the media on which the printing would occur may be somewhat non-absorbent such as the metal foil surface of a recorded hologram. Even if the overall pattern could be reproduced, the edge and corner sharpness may not be achievable with conventional wet liquid or viscous inks or dyes. This situation may be expected to become particularly severe at screen resolutions of 200 dots/inch, even more severe at screen resolutions of more than 400 dots/inch, and present even greater severity at 800 dots/inch or higher screen resolutions. In either instance these problems may likely cause the covert image to be visible even without the decoder. These considerations also generally apply to many of the embodiments described herein.

With further reference to FIG. 2A, the image (here the letter "K") 135 is built up out of a set of abutted image screen cells 153 that in combination present a continuous region of black (nondiffractive or modulated-diffractive) dots 136 in a white (diffractive) background or surround 138. This diffractive background is made up of the combination of abutting image screen 153 surround regions 155. The overall appearance is of black (non-diffractive or modulated diffractive) dots on a white (diffractive or holographic) background.

In analogous manner the non-image portions of the image screen 134 is built from field screen type cells 150 having a white (diffractive) spot 152 in a black (non-diffractive or modulated-diffractive) rectangular surround 151 and appear in the drawing to be white dots on a black background.

Figure 2D:
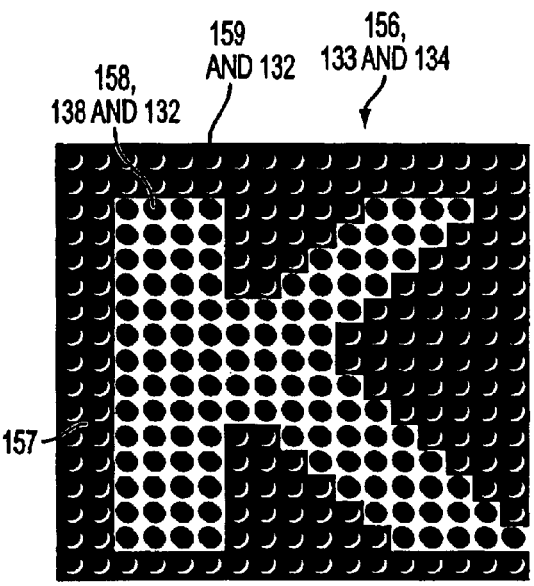
Figure 2E:
Figure 2F:
Figure 2G:
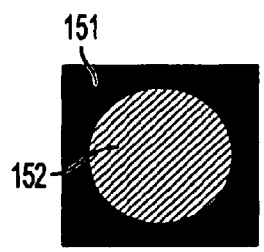
Figure 2H:
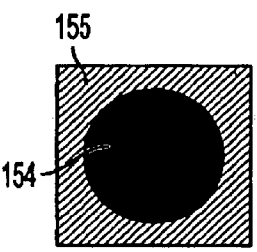

With reference to FIG. 2D, when the decoder screen 133 is overlaid in register (or substantially in register within some fraction of a dot spacing) with the image screen 134, the black or opaque dots 132 of the decoder screen overly and fill the non-opaque transparent diffractive dots 152 of the image field screen 150 cell types, and the black opaque dots 132 of the decoder screen overly and the black dots 154 of the image screen image screen 153 cell types causing no change or reinforcing the opacity, and overall resulting in a lighter image "K" within a completely black surround. It will be noted that there has been some intentional misregistration of the decoder screen and the image screen to form a composite screen 156 in FIG. 2D resulting in the white crescent moon shapes 157 that allow some diffractive light to pass, and some enlargement or elongation of the combined image screen dots and decoder screen dots 158 within the letter "K" image in FIG. 2D as a result of the slight misalignment. Contrast between the image and background, and/or brightness of the image, may generally improve as registration between the decoder screen 133 and the image screen 134 improves; however, it will be appreciated that as this is a security device and method, and perfect registration is not required to verify the presence and identity of the security feature such as the presence of the "OK" in the security device or screen 134. In reality for this and other embodiments of the invention, a viewer may typically apply the decoder screen over the security device or an article carrying the security device and move the decoder over the surface of the security device. Translation and rotation of the decoder relative to the security device will typically suggest to the viewer that alignment is close and give a visual clue as to how the decoder screen should be positioned to view the covert image. Exact alignment is not usually required to verify the presence or content of the security feature.

As noted relative to the embodiment of FIG. 1, the diagrams of FIG. 2 are magnified so that the characteristics of the image screen 134, decoder screen 133, and combination 156 may be appreciated. At this magnification, the image hidden in the field of FIG. 2A may be readily seen; however, the size of the central portions 152, 154 and surround portions 151, 155 of the field and image screen cell types 150, 153 are advantageously selected such that they provide the same or substantially the same gray scale or density appearance to the unaided eye or a human viewer and cannot be distinguished. In one embodiment, the area of the central portion 152, 154 is equal to the area of the surround portion 151, 155 in the field screen cells 150 and the image screen cells 153. Some notion of the covert or hidden nature of the image in the image screen 134 without decoding and the greater visibility of the image after decoding may be appreciated by viewing FIG. 2A and FIG. 2D at a distance, and/or by viewing the reduced scale but still somewhat magnified diagrams in FIG. 2E (image screen 134) and FIG. 2F (decoded image).

An alternative embodiment of the structure and method for using cells in a regular array is now described relative to the drawings in FIG. 3, FIG. 4, and FIG. 5 which are related. Recall that in the embodiment of FIG. 2, the inventive structure and method, though not so limited, were primarily described in terms of square field and screen cells having circular central portions.

Figure 3A:
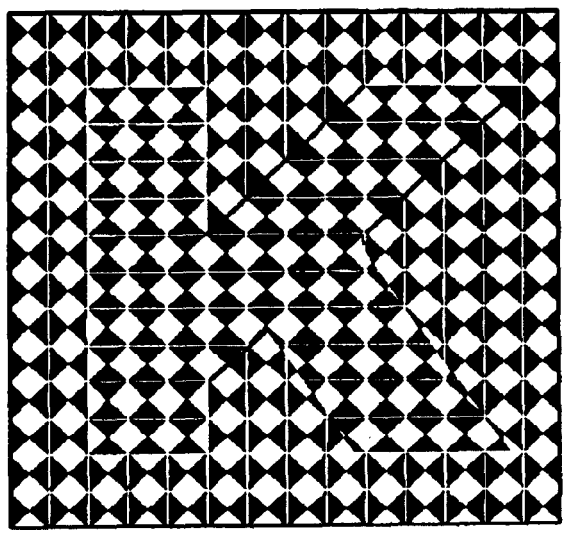
FIGS. 3a–d are diagrammatic illustrations showing aspects of a third embodiment of a form of the invention using non-circular dots or symbols in a regular array and more particularly showing the screen of an image hidden in a field.
Figure 3B:
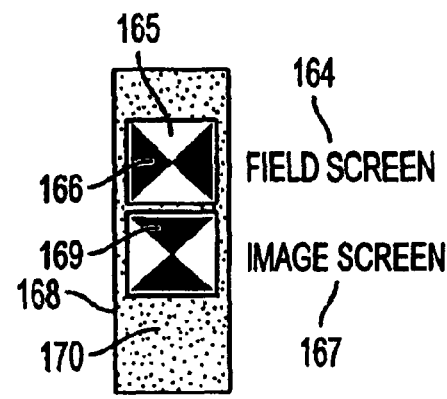
Figure 3C:
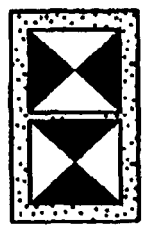
Figure 3D:
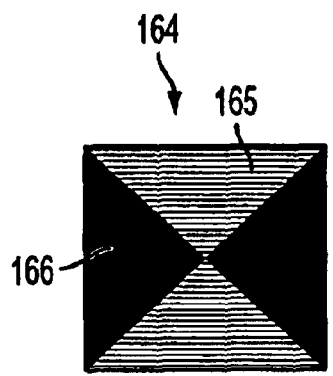

In this embodiment, the inventive image encoder (or encoder screen) 163 has field screen cells 164 and image screen cells 167 that have non-circular central portions (non-circular dots) 166, 169 for the image screen 163, and exchanges diffractive regions for non-diffractive or modulated-diffractive regions) the central portion to provide either the field screen type cell 164 or the image screen type cell 167 as illustrated in FIG. 3B. As will be described in greater detail relative to FIG. 4 and FIG. 5, the decoder screen may be comprised either of non-circular dots or of cells having non-circular dots, or may utilize circular dots such as by using conventional half-tone screens. The dark or black areas of the decoder screens in each of the FIG. 4 and FIG. 5 embodiments are non-diffractive and the white of clear areas are transparent.

With further reference to FIG. 3, the letter "K" as an example of a covert or secret image, is encoded by a plurality of image screen cell types 167 organized as the letter "K" and having a vertically stacked triangle pair or hour-glass shaped black (non-diffractive) central portion 169 surrounded by a white (diffractive or holographic) field 168. The set of image screen cells 167 is surrounded by a plurality of field screen cell types 164. In this embodiment, the central portion 166 of the field screen cell types 164 is a non-diffractive portion and the other portion 165 is the diffractive portion.

With reference to FIG. 4, the decoder screen 171 comprises a plurality of non-circular dots (appearing as diamonds or 45-degree rotated squares) in a regular two-dimensional array. As with other decoders described herein, the dark areas represent opaque non-diffractive areas and the white areas represent clear or transparent areas of the decoder. It will be observed that that the decoder screen 171 in this embodiment has dark areas corresponding to the dark areas of a regular array of the field screen type cells 164 of the FIG. 3B embodiment and clear areas corresponding to the diffractive areas of the field screen type cells.

As with other of the described embodiments, the ratio of black (non-diffractive or modulated-diffractive areas to white (diffractive or holographic) areas in the image and non-image regions are advantageously 1:1 so that the overall light diffracted from and hence the density or gray-level appearance is the same in image regions and non-image regions without the decoder and the maximum contrast is observed when decoding the covert image. In other words, the covert image is not detectable from average gray-level or light value differences. However, so long as the ratio of diffractive to non-diffractive areas in both image and field cells are the same, the covert nature of the security image can be maintained.

With reference to FIG. 4B, when the decoder 171 is substantially aligned or registered with encoded screen 163, the dark image of the letter "K" is revealed against a diffractive or holographic background image generated from the diffractive or holographic regions of the image screen, or with a different (shifted) registration may be revealed as transmitting a diffractive or holographic image from the underlying hologram against a black non-transmissive field. The covert or hidden image "OK" of FIG. 4C is revealed when decoded as illustrated in FIG. 4D. As already noted relative to other of the embodiments, the large magnification required to point out the features of the inventive structure and method depicts the image at a resolution which the covert image "K" may actually be discernable to an unaided eye, and which would in fact not be visible at the normal security device or document printing sizes. Paper reproduction technology associated with patent printing does not permit showing the image screen and decoder screen at actual size.

With reference to FIG. 5, in this alternative embodiment the structure and operation is similar to that described relative to FIG. 4, except that the decoder screen 181 comprises a plurality of circular dots 184 in a regular two-dimensional array. With reference to FIG. 5A, this regular two-dimensional array of circular dots may for example be a conventional half-tone screen of the proper dot size and spacing (or frequency). This decoder screen does not have the same dot shape as the encoded image of FIG. 3A, but nevertheless is capable of decoding the image as the dark (non-diffractive) spots of the decoder screen fill in a sufficient amount of the non-image portion that they generate the dark background and leave a sufficient amount of the diffractive or holographic image portion uncovered that the encoded image (here, the letter "K") appears white (diffractive or holographic image) against the dark background as illustrated in FIG. 5B and as well at reduced scale in FIG. 5C and FIG. 5D. The letter "K" (or any other encoded image) may be seen as a dark letter against a diffractive of holographic background image 119 by changing the alignment and effectively causing a contrast reversal. When as here, incomplete coverage of the non-image portion is accomplished owing to the difference in spot shape and/or size, the contrast may not be as great as when matching size and shape are used. It may also be appreciated that the encoded image is constructed from a plurality of field screen type cells and image screen type cells but that some of the effects and operation are the result of the interaction of the decoding screen and multiple cells rather than on a cell-by-cell basis alone. For example, the decoder screen dots may actually cover the diffractive white space created by neighboring cells and overlay without effect the dark non-diffractive portions of neighboring image screen type cells to produce the desired decoding.

As with other of the described embodiments, the ratio of black non-diffractive areas to white diffractive areas in the image and non-image regions is advantageously about 1:1 so that the overall density or gray-level appearance is the same in image regions and non-image regions and the maximum contrast is observed when decoding the covert image. In other words, the covert image is not detectable from average gray-level or light value differences. However, so long as the ratio of diffractive to non-diffractive areas in both image and field cells are the same, the covert nature of the security image can be maintained.

With reference to FIG. 5B, when the decoder 181 is substantially aligned or registered with encoded screen 163, the image of the letter "K" is revealed by transmission of diffracted light from the underlying holographic background image 119 through the transparent portions of the decoder screen. A dark letter "K" may be seen by changing the alignment of the decoder relative to the encoded image and effecting a contrast reversal. The covert or hidden image "OK" of FIG. 5C is revealed when decoded as illustrated in FIG. 5D. As already noted relative to other of the embodiments, the large magnification required to point out the features of the inventive structure and method depicts the image at a resolution which is discernable to an unaided eye and which would not be visible at the normal printing size. Paper reproduction technology associated with patent printing does not permit showing the image screen and decoder screen at actual size.

Having now described several embodiments, it may now be appreciated that these structures, methods, and techniques offer a number of advantages over the conventional structures and methods. First, the decoder may be a regular halftone screen having opaque spots and a transparent background, which is easy and cheap to produce. Second, the registration of decoder screen to the image screen is less important than with random decoder techniques where random decoder techniques require unnecessarily accurate registration between image and decoder as the dots of the image screen and the dots of the decoder screen are random rather than regular so that there is only one alignment position and every dot must align-dot-by-dot without any offset to decode the hidden or covert image. Third, the contrast and legibility of the image in the embodiments of FIG. 2 and FIG. 3–FIG. 5 is significantly better than with techniques which shift dots, screen frequencies or dot spacing (frequency), or screen angles because portions of the covert image which are to appear black in the decoded image are entirely blocked by the decoder rather than only partially blocked.

With reference to FIG. 6, attention is now directed to another embodiment of the invention that utilizes encoded and unencoded cells with identical (or substantially identical) ratio of diffractive to non-diffractive areas. With reference to FIG. 6A, a two dimensional array of cells 240 encoding a covert image is comprised of an image portion and a non-image portion (or pluralities of such portions). In each cell of the encoded cell array, the ratio of diffractive areas to non-diffractive or modulated diffractive areas is identical (or substantially identical) in each cell and thus remains constant in the encoded cell 241 and unencoded cell 242 regions. The ratio should be identical to maximize the secrecy of the encoded security feature image but may deviate from identical with some possible loss of covert character. It will be appreciated that some minor deviations from identical character may be tolerated due to minor production variations as in any commercial product. In the particular example of FIG. 6A, the ratio of the area of diffractive areas to non-diffractive areas is 2:1 as a result of the diffractive areas being 66 percent of the cell area and the non-diffractive or modulated diffractive area being 33 percent of the area.

Because the non-diffractive area in the encoded cells and unencoded cells is the same, these cell areas will on average or in aggregate direct no light to the eye of the viewer and therefore not reveal any difference between image (encoded) and non-image (unencoded) portions on the basis of the amount of light. Likewise, as diffractive area in the encoded cells and unencoded cells is the same, these cell areas will on average or in aggregate direct the same amount of light to the eye of the viewer and therefore not reveal any difference between image (encoded) and non-image (unencoded) portions. Put differently, all areas of the unmasked (or undecoded) image will direct the same amount of light to the eye of the viewer making the covert encoded image undetectable (or substantially undetectable) without the decoder. (It will also be appreciated that detectability may not be the ultimate criteria for security. Rather the ability to attach a security feature marking to a document or other article or object that has unique properties and cannot be readily copied or produced at low cost with simple equipment may be enough or even be preferred.)

Figure 6A:
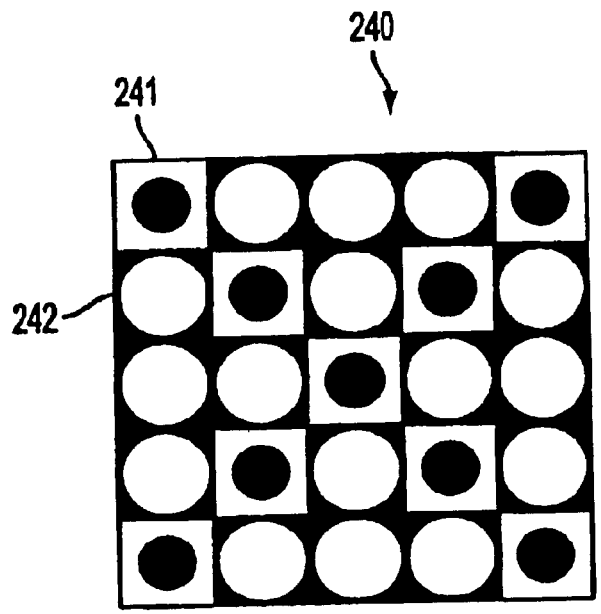
FIGS. 6a–d are diagrammatic illustrations showing an embodiment of encoded and unencoded cells with identical ratio of diffractive to non-diffractive areas.
Figure 6B:
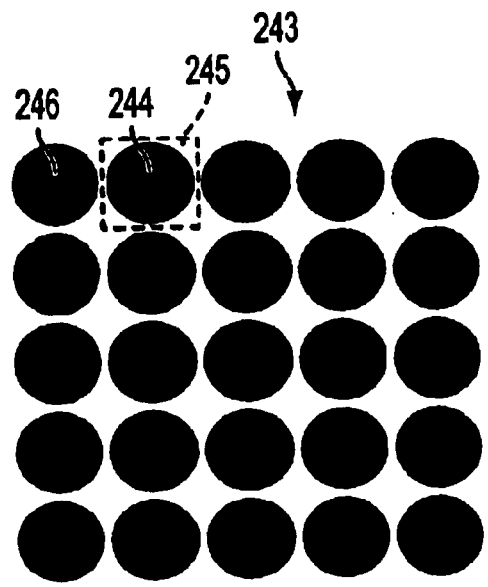

With reference to FIG. 6B, there is illustrated an embodiment of a 0.66 (66%) density screen 243 having the same cell frequency as the encoded image of FIG. 6A and having dark regions 244 and light regions 245. As with other decoders described herein, the dark areas 246 are non-diffractive opaque areas that block or mask light coming from any diffractive or holographic regions they decode, and the white areas represent clear or transparent, areas that do not mask light coming from any diffractive or holographic regions they decode.

Figure 6C:
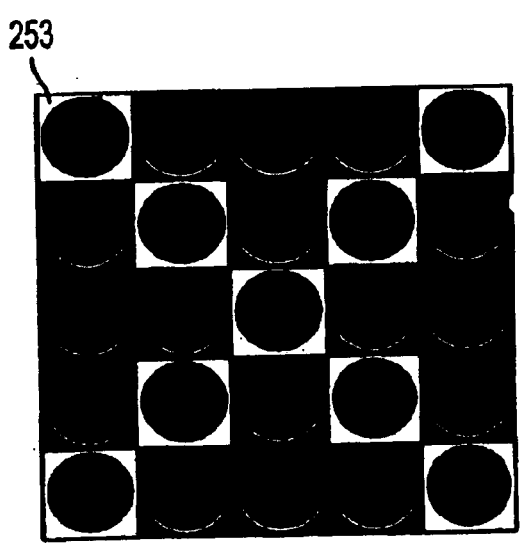
Figure 6D:
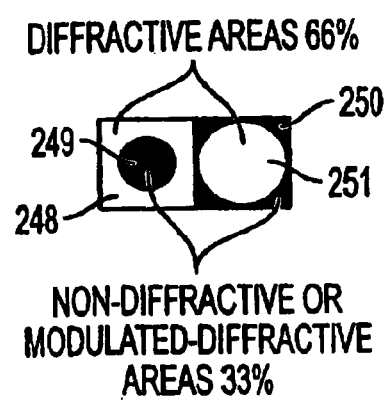

FIG. 6D shows the details of the two different cell types, the image portion cell type 241 having a large outer surround diffractive portion 248 and a central non-diffractive or modulated-diffractive portion 249, and the non-image portion cell type 242 having a large outer surround non-diffractive portion 250 and a central diffractive portion 251.

With reference to FIG. 6C, the same cells as in FIG. 6A are shown as decoded with the 0.66 (66%) density screen of FIG. 6B. It will be apparent that the only unmasked (uncovered) cells that reveal diffractive regions are those corresponding to the encoded image portions make up of 66% diffractive area cells in the surround portion 253 of the encoded cells 241. In this example, the decoded image is an "X" as illustrated in FIG. 6C.

It will be appreciated that different area ratios of diffractive to non-diffractive or modulated diffractive areas may be utilized. For example, any ratio in the range of between about 10:1 and 1:10 may be used, with area ratio in the range of between about 4:1 and 1:4 providing acceptable performance, and with area ratio in the range of between about 2:1 and 1:2 providing good performance. These are not absolute limits but rather guidelines and both larger and smaller ratios may provide an acceptable level of performance.

It will be further appreciated that different cell shapes and central dots other than square cells and circular dots may be used. For example, any polygon may be used, such as ovals, ellipses, squares, rectangles, triangles, hexagons, or other regular or irregular polygons.

Having described several embodiments using different covert image device screens and decoder device screens, attention is now directed to an embodiment that encodes multiple resolutions of a security device and/or multiple security devices on a common substrate. With reference to FIG. 7, there is illustrated an embodiment of a security device 201 having a first encoded security image feature 202 at a first resolution, scale, or screen frequency and a second encoded security image feature 204 at a second resolution, scale, or screen frequency. A plurality of scales or resolutions, or simply of different image screen orientations, background diffractive or holographic images, or other variations and combinations may be used. The first security device encode the word "OK" using circular dots in a regular array in the manner already described relative to the embodiment of FIG. 2, except that the image in the FIG. 2 embodiment will produce a white (diffractive) "OK" (except for the internal black dots) on a black (non-diffractive) background and the FIG. 7 embodiment will produce a black (non-diffractive) "OK" on a white (diffractive or holographic) background. This difference between the embodiment of FIG. 2 and the embodiment illustrated in FIG. 7 is the result of using reverse polarity or contrast of the field screen and image screen (See FIG. 7B) relative to the field screen and image screen of FIG. 2B. That is, the dots within the "K" of the embodiment in FIG. 7 are the diffractive elements whereas the dots within the "K" of the embodiment in FIG. 2 are the non-diffractive elements. This choice in polarity may of course be used for single security feature scale or resolution devices as well. The second security device encodes "OK OK" as a black (non-diffractive) letter on white or colored (diffractive) background. It will be appreciated that in other of the embodiments described herein, the transmission of light through the clear portion of a decoding screen will provide light and that the light may be white light or any portion of the spectrum, and further as is known in the art the color may change depending upon one or both of the location of the illumination and the location of the viewer. Therefore references to white also implicitly include colors other than white.

It will be appreciated that the decoder device used to decode the first and security feature should have a dot shape, dot size, and screen angle and screen frequency appropriate to decoding the security feature. In general, only one of a plurality of resolution features will be decoded or rendered visible by any single frequency decoding screen; however, those workers having ordinary skill in the art will appreciate that higher or lower multiples of an encoded image screen frequency may in fact decode the encoded image owing to the principles of frequency harmonics, frequency aliasing, and other aspects of sampling theory and/or filter theory.

It will be appreciated that any combination of different resolutions and/or polarities, and/or encoding schemes may be combined within a single security device or screen. It will further be appreciated that the plurality of security features may be placed or disposed in particular physical locations so that when using a single when using a single custom decoder screen having the appropriate decoder screen characteristics (usually including having the appropriate decoder screen resolution and frequency) to decode the image at that location. A simplified drawing showing the manner in which a plurality of encoded images may be arranged within a single security device and the corresponding decoding screen are illustrated in FIG. 7C.

Figure 8A:
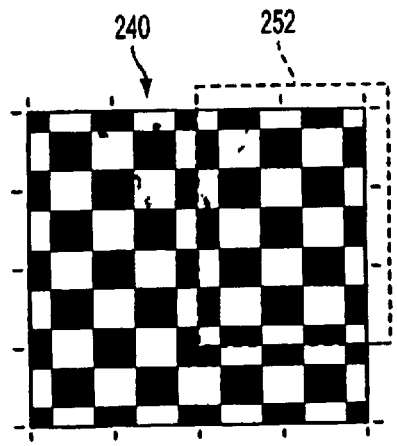
FIGS. 8a–h are diagrammatic illustrations showing an embodiment of a security device showing alternate cell types with field and image cells and decoder screen for alternate cell type.

Many of the embodiments described so far utilized a fairly simple screen, comprised either of a simple geometric shapes such as a dots on a field, or a combination of a central geometric object surrounded by a contrasting field within a cell. The screens of this type have for example been illustrated and described in FIG. 1–FIG. 7. At alternate encoding and decoding scheme using and array of single field cells 242 and single image cells 246 are now described relative to FIG. 8A. in this embodiment, field cells and image cells each comprised of nine individual components are used to construct an encoded image as illustrated in FIG. 8A.

Each single field cell 242 includes a non-diffractive (or modulated-diffractive) central core component 245 (shown here in black), four non-diffractive (or modulated-diffractive) corner components 243, and four non-corner (top, bottom, left, right) peripheral diffractive or holographic components 244 (shown here as white).

Figure 8B:
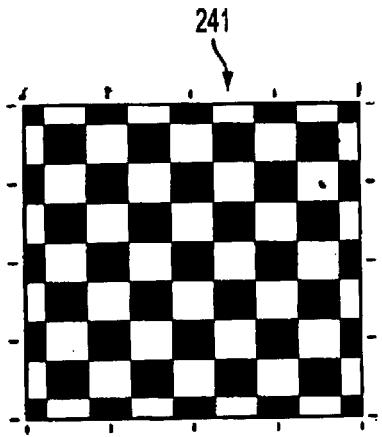

Each single image cell 246 includes a central core diffractive component 249 (shown here as white), four corner diffractive components 247 (shown here as white), and four non-corner (top, bottom, left, right) peripheral non-diffractive or modified diffractive) components 248 (shown here as black). An example of a single field cell 242 showing diffraction gratings is illustrated in FIG. 8E.

Figure 8C:
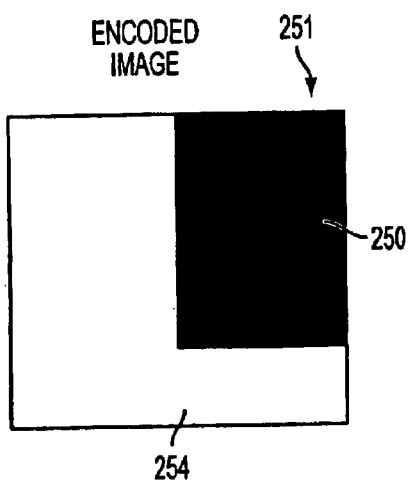
Figure 8D:
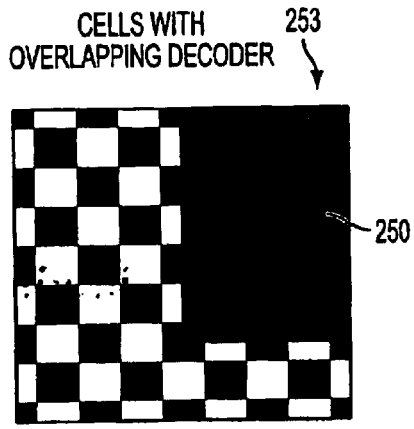
Figure 8E:
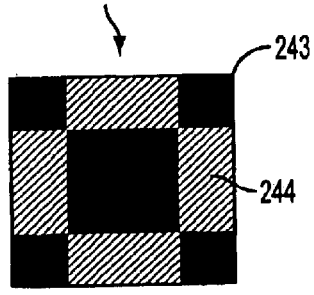
Figure 8F:
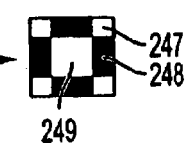
Figure 8G:
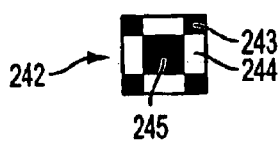
Figure 8H:

In this example, the encoded image is simply a rectangular region 250 within a non-image component field 254 as shown in FIG. 8C, however it will be appreciated that any arbitrary shape, text, image, graphic, or other encoded item may be a built from a plurality of connected or unconnected square, rectangular, polygonal, or other regions. The encoded version is illustrated in an FIG. 8A. It will be observed that as result of the differences between field cell 242 and image cell 246 the transition region occurs along a boundary between the encoded image component and the non-image component.

From these descriptions it will be appreciated that each of the image cells 246 have a component that has the opposite contrast or polarity (diffractive versus non-diffractive or modulated diffractive) as compared to each field cell 242. Other embodiments of the alternative cell type may use reverse polarity and encoding the image component 250 and the non-image component 254.

An exemplary decoder screen for this alternative cell type 241 is illustrated in FIG. 8B. in this particular embodiment will be observed that each decoder cell 256 in the decoder screen 241 has the same core, corner, on and peripheral components as each single field cell 242 in the image screen except that the decoder screen provides a clear or transparent region (white) as compared to the diffractive region of the field cells.

The appearance all of the decoder image 250 is revealed in the upper right hand corner of the decoded image showing cells of the image with the overlapping decoder. As noted earlier, these diagrams represent a highly enlarged section of the screens and reveals detail that would not normally the visible to the unneeded eye of an observer. In this example, the overall density appearance of the encoded image 250 is black (non-diffractive), and the overall density appearance of the non-image component portion is an intermediate value between the full brightness of the underlying diffractive or holographic image 119 and the about 50% of that full brightness owing to the approximately 50% transmission by the decoding screen. The embodiment described relative to FIG. 8 is nearly exemplary, and it will be appreciated that other embodiments of the inventive structure and method may utilize different alternate cell types, such as cell types using more or fewer components in and the core, corner, and peripheral components shown and described. Furthermore, different shapes may be utilized, such as for example of shapes other they and squares or rectangles, and for example including but not limited to hexagons, triangles, other polygon shapes, and the like.

Attention is now directed relative to FIG. 9, to an embodiment of the invention wherein encoding uses diffractive and modulated-diffractive regions in the cells and is decoded by a decoding device such as a decoding screen having non-diffractive mask portions and clear or transparent background as described relative to the other embodiments. It is also possible to use a modulated-diffractive decoding screen with this or any other of the embodiments so that rather than mask areas of the image screen by blocking the light the image screen, it merely redirects the light into a direction so that the light does not reach the eye of the viewer doing the decoding, but such diffractive decoding screens will generally not be used because of their much higher cost and relative unavailability.

FIG. 9A shows a regular array 301 of square cells 302 each having a circular central component 305 and a surround component 304 between the square cell 302 border and the outer diameter of the circular central component 305. Each of the circular central component 305 and the surround component 304 have diffractive regions, although the orientation or angle of the diffractive region (and optionally the spatial frequency and/or the modulation depths of the diffractive region) may differ from region to region. In the illustrated embodiments two different diffractive patterns are shown. The first type of pattern 330 provides a diffractive area 331 that diffracts light at a primary viewing angle 332, here set arbitrarily at 0-degrees, and the second type of pattern 333 that diffractive light at a secondary viewing angle 335. While orthogonal angles are not required they do guarantee maximum contrast between the two different types of pattern. These two different types of pattern are used to construct central components 305, 307 and surround components 304, 306 of image and non-image components of an encoded covert image screen 301. These patterns are simplified and more complex patterns may be used, for example, patterns that reconstruct a complex picture may generally be utilized rather than simple linear gratings.

With reference to FIG. 9A, there is illustrated in an encoded image screen 301 in the form of a five-by-five array of either image or non image cells. In this particular example, the four corner cells encoded image as does the central three-by-three array of cells. Each of these image coding cells has central component 305 with the modulated-diffractive area 334 at the secondary viewing angle 335, and the surround components 304 with the diffractive area 331 at the primary viewing angle 332. Conversely each of the non-image component cells has central component 307 with the diffractive area 331 at primary viewing angle 332 and the surround component 306 with the modulated-diffractive area 334 at a secondary viewing angle 335.

Recall that one difference between the diffractive area and the modulated diffractive areas is that in general, the diffractive area is generally intended to direct light to the viewer at one viewing angle and the modulated diffractive area is generally intended to direct light to the viewer at a different viewing angle or to present some other characteristics that distinguishes the diffractive regions, such as by presenting a different brightness or color. In one sense, the modulated-diffraction area separates on the basis of a different amplitude (grating modulation or depth), different color or grating spatial frequency, or different grating angle. In at least one embodiment, the changed or modulated diffraction characteristics should be sufficient to clearly distinguish so that the change in angle, modulation depth, or spatial frequency should be sufficient to produce the desired visual difference.

The encoded image screen of FIG. 9A may be decoded by a regular halftone dot screen having corresponding dot shape and screen frequency. An exemplary screen having such characteristics the shelving overlaid with the encoded in image screen 301 in FIG. 9D. This overlaid halftone dot screen covers the central components weather at the primary viewing angle 332 or at the secondary viewing angle 335 leaving only surround components 304, 306 of either image component or non image component regions exposed to diffractive light. It will be apparent from inspection of the drawings that all of the image encoding the regions have diffractive area 331 that the primary viewing angle 332, and that all of the non image components have modulated diffractive area 334 at the secondary viewing angle 335. Hence, as illustrated in FIG. 9E, the image is revealed in the decoded cell as seen with diffractive areas illuminated at the primary viewing angle; and as illustrated in FIG. 9F, revealed differently in the decoded cell as seen with modulated-diffractive areas illuminated at the secondary viewing angle. These two decoded versions of the same encoded screen are generated as a result all of the different exposed diffraction grating angles and combination all of illumination and viewing angles. At intermediate illumination and/or viewing angles, portions of the each of the two different diffractive grating orientations may possibly be seen.

Again it will be appreciated that this inventive embodiment is not limited solely to be cell shape or size, central component shape or size, orientation of viewing angles or by any other limitation not specifically identified here. For example, diffractive areas and modified diffractive areas may have not only different orientations but also different diffractive grating frequencies and/or different grating strengths.

This embodiment also provides structure and method for showing or displaying two overt images, such as two holographic background images 119, at two different angles (for example at 0 degrees and at 90 degrees) using the a set of diffractive gratings at a first angle and a set of modulated diffractive gratings at the second angle. Furthermore, the covert image will appear on or within one of the two overt images in one contrast state and on or within the other overt image with a reversed contrast state. Three or four security features are therefore presented or generated by the same security device, first and second different visible or overt images, a first covert image, and a second covert image that is the same as the first covert image except that the contrast is reversed.

A somewhat different embodiment of a security device is now described relative to the embodiment in FIG. 10 which provides a covert image, such as a covert text 362, within a holographic or diffractive background image. With reference to FIG. 10A, there is illustrated a simple embodiment of an unencoded cell 351 including a plurality of low-frequency grating lines 353 created by nondiffractive areas of the cell. Between these low-frequency grating lines 353 are disposed higher frequency grating lines 352 within diffractive areas of the cell 351. At the scale of the drawing these high-frequency lines cannot be seen and appear as white areas on the paper. They are only suggested (but not to scale) in the enlarged portion of the upper-right corner of the encoded image area in FIG. 10B. By low-frequency grating lines we may generally mean gratings having a frequency between about 50 lines per inch and about 250 lines per inch. By higher-frequency grating lines we may generally mean gratings having a frequency corresponding to physical dimensions of between about 0.2 microns and about 5 microns, and more typically between about 0.5 microns and about 2 microns. The ratio of low-frequency areas to high-frequency areas is advantageously about 1:1 so that the two areas (high-frequency grating areas and low-frequency grating areas) of the encoded image area are not detectable by an unaided eye at the actual scale based on differences in brightness or density. In other words, the covert image is not detectable from average gray-level or light value differences. However, as in other embodiments so long as the ratio of diffractive to non-diffractive areas in both image and field cells are the same, the covert nature of the security image can be maintained. For example, in the unencoded image area 351 of FIG. 10A, and in the letter "K" 360 portions and non-letter "K" portions 361 of FIG. 10B, in any localized area as well as the image area 356 as a whole, the ratio of high-frequency portions to low-frequency portions is the same. It would also be acceptable and provide the desired covertness if their were a larger percentage of high-frequency areas to low-frequency areas so long as the ratio (for example, a ratio of 1:2 or 2:1) was maintained in both the non image encoding areas 361 and the image encoding areas 360. In principle, gradual variations over the entire area or variations in ratio that did not reveal the covert feature may also be acceptable, though such variations may suggest to a knowledgeable entity that their was hidden information. (Note, that in the structure illustrated in FIG. 10 as well as those illustrated the other drawings of this application are not necessarily to scale, but instead are intended to provide the general understanding all of how to make and use the invention. Given that many of the structures exist at the sizes too small to present on a printed paper, the diagrams are not drawn to show actual sizes but instead to illustrate inventive principles.)

The encoded cell 356 includes a complex low-frequency grating structure shown in FIG. 10B in the encoded cell that encodes a low-resolution graphic such as the letter "k" 362 of FIG. 10C. Note that the drawings in FIG. 10 depict unencoded image and encoded image area portions for purpose of illustration, and that larger areas and more complex or different encoded image patterns may generally be provided. The embodiment is not therefore limited to single symbols, text letters, or other particular graphics or images.

This encoded cell area 356 is effectively comprised of an uniform or regular overall background or unencoded layer of high-frequency and low-frequency gratings except where a covert feature is to be located. In the embodiment illustrated here, this unencoded layer 351 comprises alternating bands of high- and low-frequency lines or gratings in a uniform angular direction. As will be described subsequently, the angular orientation of the gratings in the background portion 351, 361 provides advantageous features for viewing the covertly recoded non-background portion 360 which has a different angular orientation. In this embodiment, the background high and low frequency grating structures are 90-degrees or orthogonal to the background gratings and provides separation.

The encoded image areas 356 therefore include regions having higher frequency grating lines 352 and regions of low-frequency grating lines 353. In general, the high-frequency regions need not be limited to only linear grating but may also or alternatively include other diffractive or holographic elements or features. These areas may for example store and encode a background pictorial image or graphic 119. Again these cells are visible in or near zero-order (undiffracted) order when properly illuminated and viewed.

This embodiment of the security device provides an opportunity to present for viewing two (or more) images as a background diffractive or holographic image 119, such as for example a pictorial image of a mountain, Visa™ Dove, or other graphic or image; and also provides a second security feature such as the "OK" text or other text, symbol, patterns, or other graphic overlay in addition to the holographic background image. The covert image of the "K" in FIG. 10C represents just a single letter of such "OK" images. These two images are separately revealed on the basis of their different spatial frequency content, the pictorial image having high-frequency content appropriate to storing and reconstructing the holographic image and lower-spatial frequency content appropriate to storing and revealing an larger scale lower-detail overlay image such as a text or simple graphic.

Usually, the pictorial image will be recorded at spatial frequencies corresponding to physical dimensions of between about 0.2 microns and about 5 microns, and more typically between about 0.5 microns and about 2 microns, and the covert security feature will be recorded at spatial frequencies between about 50 lines per inch and about 250 lines per inch. More typically the pictorial image will be recorded at spatial frequencies corresponding to physical dimensions of between about 0.7 microns and 1.3 microns, and the overly security feature will be recorded at spatial frequencies between about 100 lines per inch and about 200 lines per inch. The actual frequency ranges are not so important as maintaining a large difference between the frequencies of the two images.

As in other of the embodiments, the high-frequency content and the low-frequency content each cover about 50% of the area. The low-frequency content may typically be at such lower-frequency that it acts to dim or diminish the brightness of the high-frequency information and by distributing this low-frequency content more-or-less uniformly the security feature images is not revealed to the unaided eye unless the security device is viewed in the proper orientation relative to an illumination source so that the low-frequency information is revealed to the viewer.

It will be appreciated that the superimposed low frequency lines diffract light but at a different angle than the higher-frequency lines. The low-frequency lines (or other pattern) diffracts light at a smaller angle closer to the so called zero order or undiffracted light. This undiffracted light in the context of a reflective material is direct reflection and the viewer therefore is able to view the security feature revealed by the low-frequency content by viewing the security device at or near the direct reflection angle. The holographic background image 119 may not be visible at or near the direct reflection angle so that the security encoded image may be revealed with high contrast, such as illustrated in FIG. 10C. It will be appreciated that the white areas in FIG. 10C include high frequency diffractive or holographic gratings which cannot be shown given the difference in scale between the high-frequency and low-frequency lines. In fact, the magnitude of the difference between the two grating sets shown in FIG. 1B are much smaller than they are in reality and the drawing is provided only to lend some understanding to the inventive structure and method.

It will also be appreciated that although simple uniform linear gratings are illustrated, the high frequency gratings may be either simple or complex diffractive or holographic gratings known in the art, such as for example grating structures appropriate to high-quality pictorial holographic images.

It will further be appreciated in light of the description provided here that the inventive security features such as the encoded image are generated within the hologram when the original (or copy) hologram is recorded, such as within a conventional holographic image, and in at least one embodiment are not overprinted after such hologram production. The full resolution potential of the holographic recording process is therefore maintained and the inventive structure, system, and methods do not suffer from the same problems and limitations as would be encountered by ink or dye printing techniques.

With reference to FIG. 11, there is illustrated another embodiment of the invention provides for multiple covert images that are separated or separable by direction. FIG. 11A illustrates a first covert component 501 (Component A) encoding an "O" and FIG. 11B illustrates a second covert component 502 (Component B) encoding the letter "K". The letter "K" is turned 90-degrees to indicate the orientation of the direction of viewing at which it will be visible when decoded (See FIG. 11H and FIG. 11I).

Figure 11A:
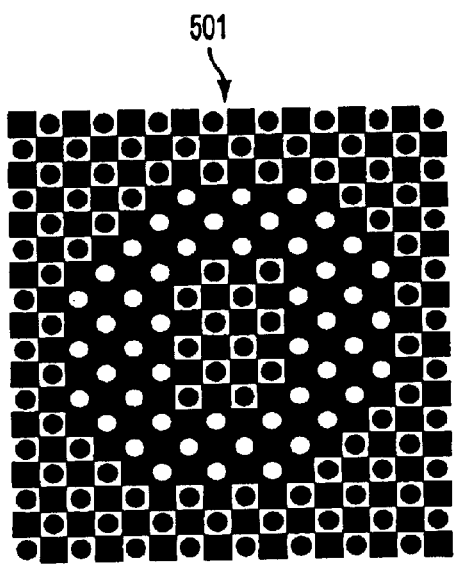
Figure 11B:
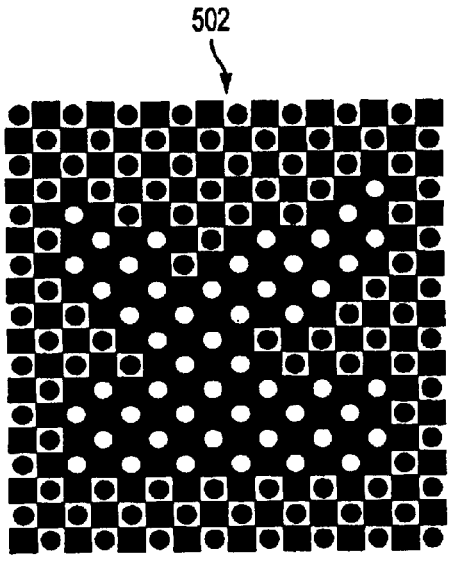
Figure 11C:
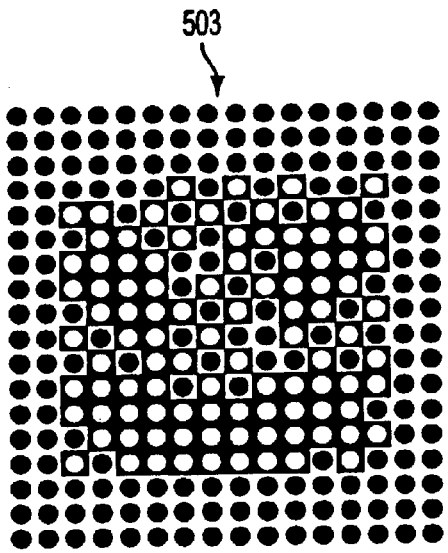
Figure 11D:
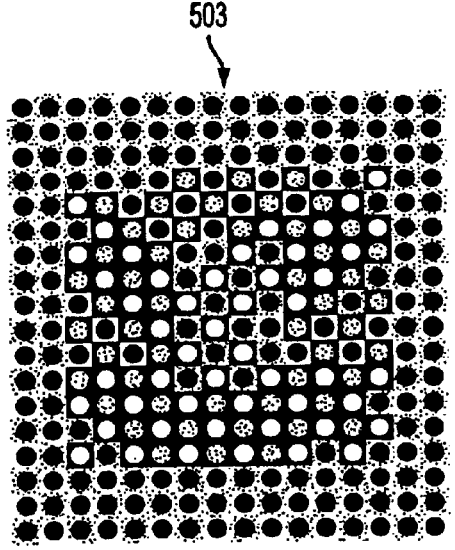
Figure 11E:
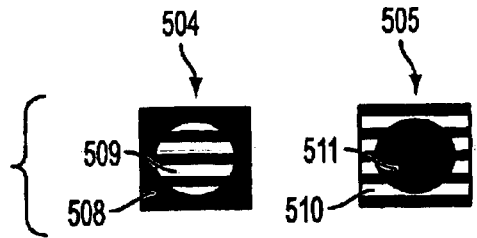

Component A 501 is encoded with the image and field cells 504, 505 illustrated in FIG. 11E, and each include both a diffractive portion 509, 510 and a void or non-diffractive portion 508, 511. In this embodiment, the component A image and field cells have gratings oriented in a first direction, here shown horizontal relative to the page.

Figure 11F:
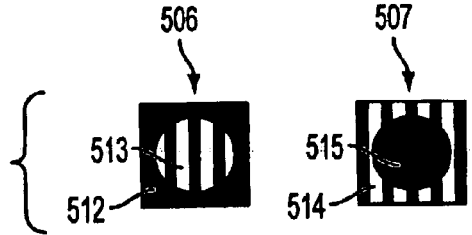

Component B 502 is similarly (but differently) encoded with the image and field cells 506, 507 illustrated in FIG. 11F, and each include both a diffractive portion 513, 514 and a void or non-diffractive portion 512, 515. In this embodiment, the component B image and field cells have gratings oriented in a second direction, here shown vertically relative to the page, and orthogonal relative to the first direction.

While two components and two directions are shown here, it will be appreciated than more than two components may be provided by providing additional gratings and different orientations to that particular components may be decoded and viewed only from the predetermined direction associated with the diffraction grating direction. The shapes of the image and filed cells or heir components are not restricted to the squares and circular dots shown here but may be any shape including but not limited to the shapes described elsewhere for other embodiment of the invention.

The combined components are illustrated in FIG. 11C without attempting to distinguish component A from component B, and in FIG. 11D with black, white, and mid-gray tones to attempt to distinguish the different combinations.

FIG. 11G is an illustration of a decoding screen 520 having a regular array of opaque dots 521 in a clear or transparent field 522. The decoding screen dots are not limited to circular dots as illustrated here, but are chosen in conjunction with the image and filed cells shapes, and need not match.

FIG. 11H illustrates the appearance of component A 501 decoded by decoding screen 520 and viewed from the indicated "VIEW DIRECTION A" which is a direction in which light diffracted from the component A image and field cell first direction (horizontal) grating lines would be diffracted to reach the eye of a viewer. Note that any light diffracted from the component B (vertical) grating lines would not reach the eye of a viewer from the component A view direction.

Correspondingly, FIG. 11I illustrates the appearance of component B 502 decoded by decoding screen 520 and viewed from the indicated "VIEW DIRECTION B" which is a direction in which light diffracted from the component B image and field cell second direction (vertical) grating lines would be diffracted to reach the eye of a viewer. Note that any light diffracted from the component A (horizontal) grating lines would not reach the eye of a viewer from the component B view direction.

It will therefore be appreciated that the two covert images, in this example "O" and "K", but in general any text, image, or graphic, can be separated on the basis of viewing direction. In similar manner, providing additional grating line orientations and viewing those components at the appropriate viewing direction will provide for multiple covert images separated on the basis of direction. In such instances, the checkerboard pattern would distribute the multiple component image and field cells among the available array locations.

Figure 12A:
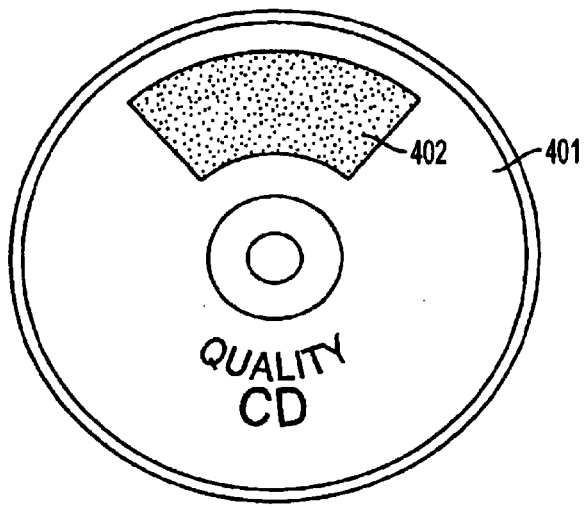
FIGS. 12a–c are diagrammatic illustrations showing an embodiment of a document (CD) carrying and encoded with the security device alone and as viewed through a decoder device.
Figure 12B:
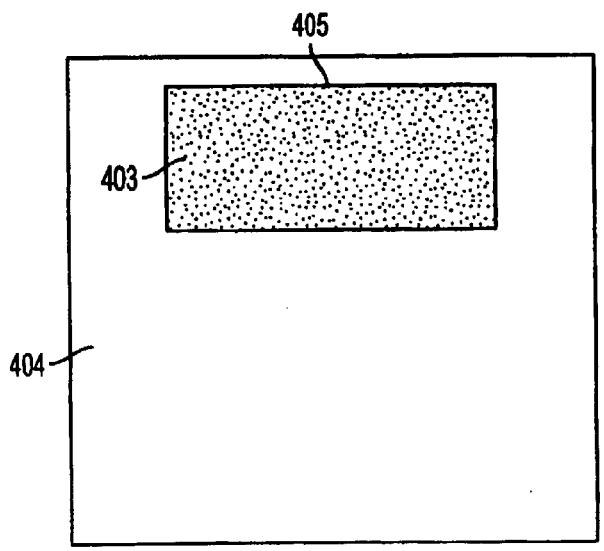
Figure 12C:
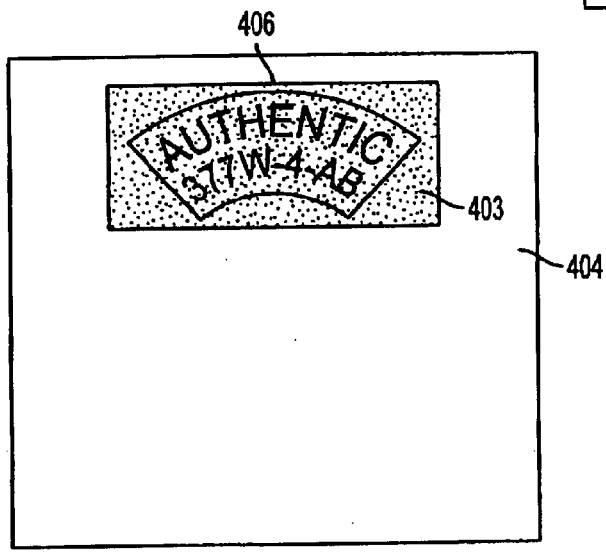

FIG. 12 is a diagrammatic illustration showing an embodiment of a document (CD) 401 carrying and encoded with the security device 402 alone and as viewed through a decoder device 403 attached to or integrated with a CD sleeve 404 as a clear half-tone screen (or other decoding device) in an aperture or hole 405 in the sleeve. When aligned with the security device 402, the encoded covert and now visible security feature 406, here in the form of the text "AUTHENTIC 377W-4-AB" is revealed through the window.

Figure 13:
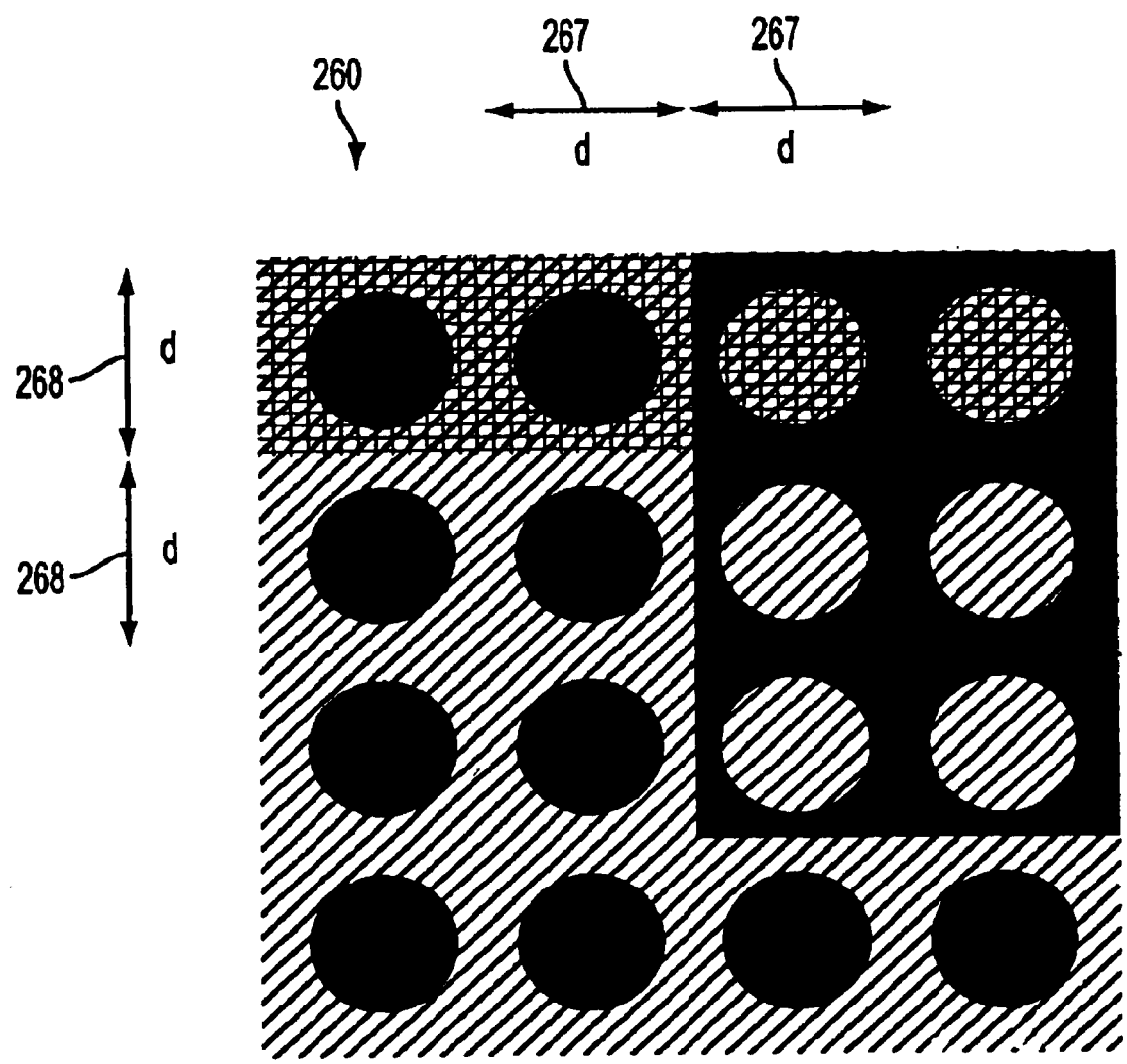

FIG. 13 is a diagrammatic illustration showing an embodiment of a security device showing cell and array spacing (d) 267, 268; and structure indicating that the structure may be built-up and/or recorded out of a plurality of picture elements or pixels. The detailed pixel structure is shown only in the upper row of cells for both diffractive regions where grating lines are illustrated and for non-diffractive areas shown here in black without grating lines.

Figure 14:
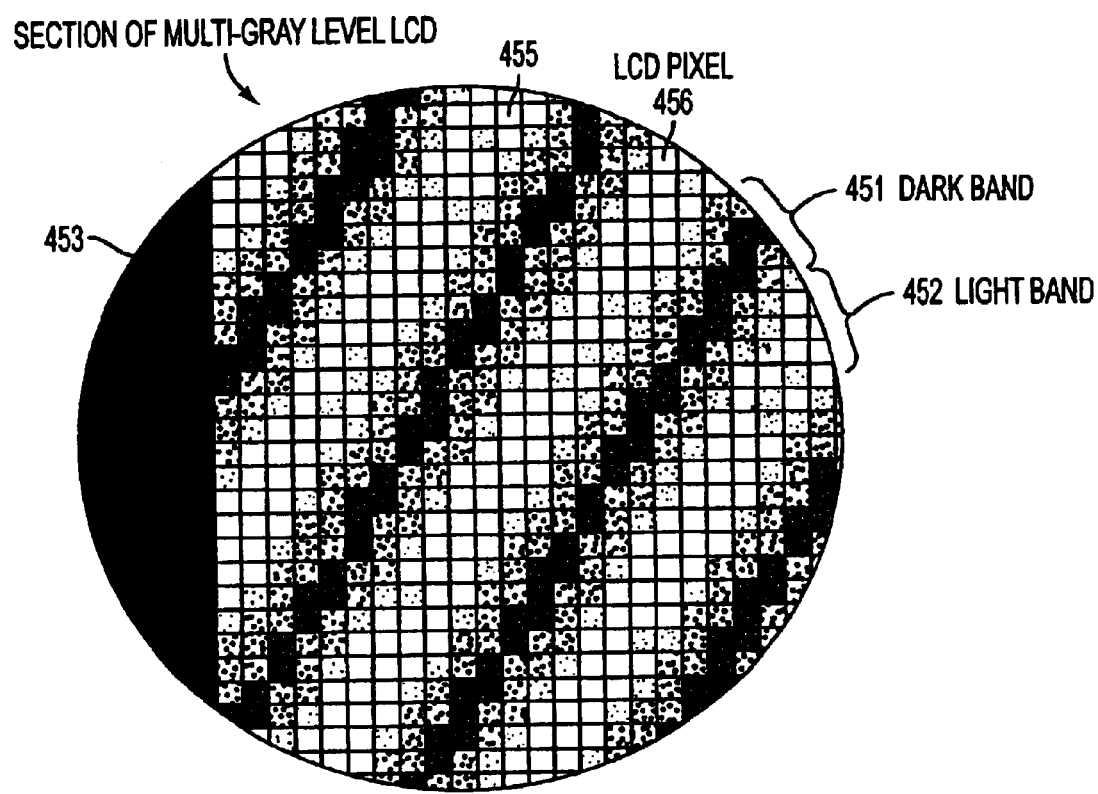

FIG. 14 is a diagrammatic illustration showing additional detail of the manner in which high-resolution grating lines, non-diffractive regions, and sharp transitions between diffractive regions and non-diffractive regions may be recorded. In the embodiment shown, a desired image pattern is first images on a liquid crystal display (LCD) screen and then recorded. Each of the delineated squares represents an LCD screen 455, and dots within the squares represent LCD pixels 456. A blacker LCD screen 455 is built up of more dark pixels than are the light LCD screens. The dark band 451 and light band 452 regions represent ridges and troughs of diffractive elements, and the solid black region 453 represents a portion of a much larger non-diffractive element or area. Here the non-diffractive element or area has at least one linear edge, but neither the non-diffractive areas nor the recording technique is limited to linear features.

Apparatus and method for making a recording of this type is described in U.S. Pat. No. 5,986,781 issued Nov. 16, 1999 entitled Apparatus And Method For Generating Diffractive Element Using Liquid Crystal Display; and U.S. Pat. No. 6,222,650 issued Apr. 24, 2001 entitled Holographic Authentication Element And Document Having Holographic Authentication Element Formed Thereon, and U.S. patent application Ser. No. 09/802,714 filed Mar. 8, 2001 entitled Holographic Authentication Element; each of which patent and patent application are incorporated by reference herein. Other and different apparatus and technique may be used to make or otherwise generate or record the inventive structures so that the invention is not limited to the particular apparatus or technique described in the above patents or patent application.

FIG. 15 is a diagrammatic illustration showing the manner in which a final composite image may be constructed that incorporates diffractive elements and non-diffractive elements (such as non-diffractive dots) using the methods and apparatus described in the above patents and patent application. This diagram shows a larger area of the final composite image 630 where a region having only diffractive fringes is shown at multiple levels of detail in FIG. 15a, FIG. 15(a)1, and FIG. 15(a)2. A different sequence is shown for an area having diffractive elements and non-diffractive dots in FIG. 15(a), FIG. 15(b)1, and FIG. 15(b)2.

FIG. 15A illustrates the regions 625 where a covert "OK" is present in the security device 630. The encoding may be by any of the structures and methods described herein even though the illustrated example uses a regular array of dots and displaced dots as described relative to FIG. 1. In practice, the undecoded security feature 625 would not be visible and is shown in phantom lines so that nature of the invention may be fully understood.

While the present invention is not limited to being manufactured or printed using any particular technique or equipment, exemplary techniques for holographic and other diffractive printing are described for example, in the following United States Patents assigned to Pacific Holographics, Inc. the assignee of the present patent application: U.S. Pat. No. 5,986,781 issued Nov. 16, 1999 entitled Apparatus And Method For Generating Diffractive Element Using Liquid Crystal Display; and U.S. Pat. No. 6,222,650 issued Apr. 24, 2001 entitled Holographic Authentication Element And Document Having Holographic Authentication Element Formed Thereon, each of which patents is herein incorporated by reference. The dot patterns illustrated and described herein may be produced by any method or device, including the methods and devices of these patents and patent applications. Each of the patents and patent applications referenced herein are incorporated by reference.

The foregoing descriptions of specific embodiments and best mode of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

We claim:

1. A security device comprising:

a pattern formed from an array of cells having at least two substructure regions within each cell and displaying an unencoded component visible to the unaided eye of a viewer and an encoded covert image component not readily discernable to the unaided eye of a viewer from any viewing angle without a separate decoder;

said substructure regions for image cells and for non-image cells having the same geometry but different contrast; the image cells having a contrast that is selected from the set: (i) diffractive regions, (ii) modulated-diffractive regions, and (iii) non-diffractive regions; the non-image cells having a contrast selected from the same set but different from the contrast of the image cells; said modulated-diffractive regions having at least one diffractive characteristic different than a diffractive characteristic of said diffractive regions;

each cell and the at least two substructure regions within each cell being small enough to be not readily discernable to the unaided eye of a human viewer;

each cell having at least one substructure that is a diffractive region and at least one substructure region that is a non-diffractive or modulated-diffractive region, the ratio of the area of the diffractive region to the area of the non-diffractive or modulated-diffractive region of the at least two substructure regions in each cell of the encoded or unencoded cells being substantially identical;

the encoded component not visible to an unaided eye being encoded into said pattern by substantially reversing the contrast of each cell forming a portion of the encoded covert image component to change diffractive portions to non-diffractive or modulated-diffractive portions, and to change non-diffractive or modulated-diffractive portions to diffractive portions, the brightness within each cell remaining substantially unchanged as a result of the contrast reversal by maintaining a substantially constant ratio of substantially 1-to-1 between the diffractive area to the non-diffractive or modulated-diffractive areas among the substructure regions within the cells so that the same amount of light is diffracted to the viewing location from the cells; and the encoded component not readily visible to an unaided eye of said viewer being rendered visible to the unaided eye of said viewer when viewed through an external decoding device.

2. The security device in claim 1, wherein the security device comprises a diffractive security device.

3. The security device in claim 1, wherein the security device comprises a holographic security device.

4. The security device in claim 1, wherein the diffractive regions have a diffractive frequency, diffractive angular orientation, and a diffractive modulation strength.

5. The security device in claim 1, wherein the modulated-diffractive regions have a modulated diffractive spatial frequency, a modulated diffractive angular orientation, and a modulated diffractive modulation strength.

6. A security device as in claim 1, wherein said external decoding device comprises a decoding screen.

7. A security device as in claim 6, wherein said external decoding screen comprises a two-dimensional array of screen elements having shapes and sizes corresponding to shapes and sizes of the encoding regions.

8. A security device as in claim 1, wherein the unencoded component visible to the unaided eye comprises a holographic macroscopic image comprised of diffractive elements.

9. A security device as in claim 1, wherein said security device comprises a diffractive security device or a holographic security device.

10. A security device as in claim 1, wherein each said cell being small enough to be indiscernible to the unaided eye of a viewer by having a size dimension of between substantially 1/100 inch and 1/2000 inch.

11. A security device as in claim 1, wherein each said cell being small enough to be indiscernible to the unaided eye of a viewer by having a size dimension of between 1/400 inch and 1/1000 inch.

12. A security device as in claim 1, wherein each said cell being small enough to be indiscernible to the unaided eye of a viewer by having a size dimension less than the visual acuity of a standard human having 20/20 vision and viewed from a distance of between 4 inches and 40 inches.

13. The security device in claim 1, wherein the substrate comprises a substantially transparent substrate.

14. The security device in claim 1, wherein the substrate comprises a reflective substrate.

15. The security device in claim 1, wherein the external decoding screen comprises a screen having a regular array of substantially non-transparent opaque non-diffractive areas on a substantially transparent non-diffractive substrate.

16. The security device in claim 15, wherein substantially non-transparent opaque areas comprise substantially non-transparent opaque round dots.

17. The security device in claim 1, wherein the external decoding screen comprises a screen having a regular array of transparent regions forming dots on an opaque substrate.

18. The security device in claim 1, wherein said opaque dots transmit less than 50% of the light incident thereon.

19. The security device in claim 1, wherein the security device further comprises the external decoding device.

20. The security device in claim 1, wherein the device further comprises the external decoding device and the external decoding device comprises a screen having a substantially regular pattern array of dots selected from the set of geometrical shapes selected from the set of shapes consisting of: dots, circles, ovals, squares, rectangles, triangles, pentagons, hexagons, regular or irregular polygons, symbols, or combinations thereof.

21. The security device in claim 1, wherein the two-dimensional array comprises a two-dimensional array of substantially square cells.

22. The security device in claim 7, wherein the decoding screen is binary being either substantially opaque or substantially transparent and the ratio of opaque areas to transparent areas in any given cell is substantially 0.5.

23. The security device in claim 1, wherein the hidden content is encoded by a contrast reversal changing at least some of a non-diffractive area to a diffractive area and at least some of a diffractive area to an non-diffractive area, said contrast reversal maintaining the ratio of diffractive areas to non-diffractive areas at substantially 0.5.

24. The security device in claim 1, wherein the security device presents the impression of a plurality of apparent gray levels or differences in transmission or reflectivity.

25. The security device in claim 24, wherein an apparent gray level is achieved by altering one of the angular orientation of the diffractive structure of the hologram or the modulation of the diffractive structure of the hologram so that the magnitude of light reaching any particular viewing position from any particular region of the holographic device is increased or decreased to achieve apparent gray scale density variations.

26. The security device in claim 25, wherein any apparent gray level is achieved by altering one or more of: (i) increasing or decreasing the area of the diffractive structures in the cells of the hologram (ii) the angular orientation of the diffractive structure of the hologram, or (iii) the frequency of the diffractive structure of the hologram, or (iv) the modulation of the diffractive structure of the hologram, so that the magnitude of light reaching the eye of the viewer at any particular viewing position from any particular region of the holographic device is increased or decreased to achieve apparent gray scale density variations.

27. The security device in claim 25, wherein any apparent gray level is achieved by increasing or decreasing the area of the diffractive structures in the cells of the hologram, so that the magnitude of light reaching the eye of the viewer at any particular viewing position from any particular region of the holographic device is increased or decreased to achieve apparent gray scale density variations.

28. The security device in claim 1, wherein the diffractive regions are revealed through the transparent portions of the decoding screen.

29. The security device in claim 1, wherein polychromatic color is achieved by altering the spatial frequency of the diffractive structures.

30. The security device in claim 1, wherein the shape of the cell regions remain the same even when any of the diffractive or holographic grating frequency, diffractive or holographic angular orientation, and diffractive or holographic modulation strength is modified to achieve gray scale density or color variations.

31. The security device in claim 1, wherein the size of a screen elements is fixed.

32. The security device in claim 1, wherein the size of a contrast reversed dot is fixed.

33. The security device in claim 1, wherein each of the non-contrast reversed screen dots comprises a substantially fifty-percent dot.

34. The security device in claim 1, wherein each of the contrast reversed dots comprises a fifty-percent dot.

35. The security device in claim 1, wherein each of the non-contrast reversed screen dots comprises a fifty-percent region of having the same but arbitrary shape within the security device.

36. The security device in claim 1, wherein each of the contrast reversed screen dots comprises a fifty-percent region of arbitrary shape complementary to the shape of the non-contrast reversed regions, the arbitrary shape being the same within any single security device.

37. The security device in claim 1, wherein the cells have periodic spacing screen element spacing of any amount between about 50 screen elements per inch and about 2000 screen elements per inch.

38. The security device in claim 37, wherein the screen has a screen element spacing of any of about: 100 screen elements per inch, 200 screen elements per inch, 250 screen elements per inch, 300 screen elements per inch, 400 screen elements per inch, 500 screen elements per inch, 600 screen elements per inch, 800 screen elements per inch, 1000 screen elements per inch, 1500 screen elements per inch, and 2000 screen elements per inch.

39. The security device in claim 1, wherein the cell screen elements comprise round dots on a square surround, or square dots on a round surround.

40. The security device in claim 1, wherein the security feature is rendered substantially invisible or undetectable to an unaided eye of a viewer by virtue of it being at a scale that is less than the resolution of the unaided eye of the viewer and is rendered visible or detectable to the unaided eye of the viewer when viewing through the decoding device by virtue of the decoding device aligning substantially opaque regions of screen cells in the decoder with substantially opaque regions of the contrast reversed screen cells of the image to generate first regions having higher opacity and second regions having lower opacity than surrounding non-information carrying regions.

41. The security device in claim 1, wherein:
said device is encoded with more than one covert component, in which discrete areas containing covert components are generated with different regular arrays of cells of particular size, spacing, shape, and cell array frequencies.

42. The security device in claim 1, wherein the security device includes discrete regions that are decodedable with different decoding screens, or are decodable with a single decoding screen that has the corresponding regions to match the encoded covert components in the security device.

43. The security device in claim 42, wherein the different screens have array frequencies corresponding to the array frequencies of the covert component frequencies, and the single screen has the corresponding array frequencies in the corresponding regions, to match the encoded covert components in the security device.

44. The security device in claim 42, wherein the different screens have particular size, spacing, shape, and array frequencies corresponding to the size, spacing, shape, and array frequencies of the covert component, and the single screen has the corresponding size, spacing, shape, and array frequencies in the corresponding regions, to match the encoded covert components in the security device.

45. The security device in claim 1, wherein said security device includes features that are at a higher spatial frequency than the decoder device screen needed to decode the security device.

46. The security device in claim 1, wherein said security device features include features at spatial frequencies greater than or equal to 200 lines per inch.

47. The security device in claim 1, wherein said security device features include features at spatial frequencies greater than or equal to 400 lines per inch.

48. The security device in claim 1, wherein the security device is formed at the same time and integral with a holographic image on a common substrate.

49. The security device in claim 1, wherein the decoder device screen needed to decode the security device includes spatial frequencies greater than 200 lines per inch.

50. The security device in claim 1, wherein said security device and screen decoder are formed with a frequency array of cells greater than 200 lines per inch.

51. The security device in claim 1, wherein said security device and screen decoder are formed with a frequency array of cells greater than 200 lines per inch using a printing system and method different from laser photo-plotting, embossing a special grating structure, or combinations thereof.

52. The security device in claim 1, wherein the device is generated with any technique including by laser photo-plotting or by embossing a special grating structure corresponding to the cell array.

53. The security device in claim 1, wherein said device is comprised of first grating structures disposed either in a matrix of void areas or in a matrix of second gratings oriented at a angle different from an angle of the first grating structures.

54. The security device in claim 1, wherein the decoder device functions by diffracting light away from the viewers eye in regions of the security device where the diffractive regions of the device diffracts light toward the viewer.

55. The security device in claim 1, wherein decoder device functions by diffracting light diffracted by the diffractive regions of the security device and coming from the security device into a new direction from which the encoded image can be observed.

56. The security device in claim 1, wherein said device comprises a two-dimensional array of cells with complex multiple element diffractive and non-diffractive or modulated-diffractive shapes, and its corresponding decoding screen comprises a two-dimensional array of cells with substantially identical complex multiple element shapes.

57. The security device in claim 1, wherein the substantially identical decoding screen complex multiple element shapes are contrast modified relative to the security device multiple element diffractive and non-diffractive or modulated-diffractive shapes.

58. The security device in claim 1, wherein the cells comprise a field cells and image cells, each having a different pattern and being combined to encode the covert image.

59. The security device in claim 1, wherein said cells include multi-part field cells and multi-part image cells, the field cells and image cells being complementary in that each diffractive part of an image call has a non-diffractive or modulated-diffractive counterpart in the field cell.

60. The security device in claim 1, wherein said security device is encoded with a semi-covert low frequency component such that the semi-covert component is visible in or near a zero-frequency order when the security device is viewed in reflection without a decoder screen, but is invisible when the security device is viewed at an angle which reveals the unencoded component.

61. The security device in claim 60, wherein said reflection comprises direct reflection.

62. The security device in claim 1, wherein said device is comprised of a mesh of first grating structures disposed in a matrix of void areas, and second grating structures oriented at angles different from the angles of the first grating structures and also disposed in a matrix of void areas, said first and second grating structures and voids areas revealing different covert images at different angles, either with the same, or with different decoders.

63. The security device in claim 1, wherein said security device is encoded with a covert component and a semi-covert component;
the covert component comprising an encoded covert feature viewable through a decoder; and
the semi-covert component being formed such that the semi-covert component is visible in or near a zero-frequency order when the security device is viewed in reflection without a decoder screen, but is invisible when the security device is viewed at an angle which reveals the unencoded component said semi-covert component being visible without a decoder.

64. The security device in claim 63, wherein the semi-covert component is generated with a two-dimensional array of cells having diffractive portions and non-diffractive portions the shapes and angles of which at least one of the diffractive portions and non-diffractive portions accentuate the visibility of the semi-covert image component when viewed in zero order.

65. The security device in claim 64, wherein the shapes are selected to accentuate the visibility of the semi-covert image component when viewed in or near zero order.

66. The security device in claim 64, wherein the angles are selected as to accentuate the visibility of the semi-covert image component when viewed in or near zero order.

67. The security device in claim 64, wherein the semi-covert component viewable in zero order is created by forming semi-covert image component structures at a lower spatial frequency than the diffractive structures which form the covert image.

68. The security device in claim 64, semi-covert image component structures frequencies are formed at spatial frequencies in the range between substantially 50 lines per inch and substantially 400 lines per inch, and the covert image is formed at spatial frequencies in the range between substantially 500 lines per mm and 2000 lines per mm.

69. The security device in claim 1, wherein said encoded covert component may be decoded all or in part by printing, perforating, or demetallizing a decoder screen directly on the security device.

70. The security device in claim 1, wherein said security device comprises an embossed security device.

71. The security device in claim 1, wherein said encoded covert component is embedded in the non-data carrying surface of a optically recorded device or applied to the optically recorded device as a label, and a carrier for the optically recorded device includes the corresponding decoder screen in a transparent window of the carrier such that when the optically recorded device is inserted in the carrier the covert component is decoded.

72. The security device in claim 71, wherein said optically recorded device is a device selected from the group consisting of a CD and a DVD; and the carrier comprises a sleeve or case for the CD or DVD.

73. The security device in claim 1, wherein said encoded covert component is embedded in the non-data carrying surface of a CD or applied to the CD as a label, and the CD sleeve printed with a corresponding decoder screen in a transparent window such that when the CD is inserted in the sleeve the covert component is decoded.

74. The security device in claim 1, wherein the substrate is selected from the set of substrates consisting of: paper, plastic, metal, polymers, embossable reflective materials, embossable refractive materials, metallized papers, metallized polymers, metallized foils, thermoplastic materials, hologram substrates, and combinations thereof.

75. The security device in claim 1, wherein the security device is coupled with or integrated into a document selected from the set of documents consisting of: a bank check, a currency, a ticket, a banknote, a credit card, a debit cards, an identification card, a passport, a certificate, a visa, a travel document, a travelers check, an anti-counterfeiting label or marking, a postage stamp, a birth certificate, a death certificate, a vehicle registration, a vehicle identification marking, a vehicle registration card, a health care identification or benefit card or document, a real property deed, a controlled substance identification, a certificate of title, a tax seal, a voter identification seal, a drivers' license, an optical data storage devices, a CD, a DVD, an item of computer software, a facility access card, and combinations thereof.

76. A secure document comprising:
a substrate;
a pattern formed integral with or carried by the substrate;
said pattern formed from an array of cells having at least two substructure regions within each cell and displaying an unencoded component visible to the unaided eye of a viewer and an encoded covert image component not readily discernable to the unaided eye of a viewer from any viewing angle without a separate decoder;
said substructure regions for image cells and for non-image cells having the same geometry but different contrast; the image cells having a contrast that is selected from the set: (i) diffractive regions, (ii) modulated-diffractive regions, and (iii) non-diffractive regions; the non-image cells having a contrast selected from the same set but different from the contrast of the image cells; said modulated-diffractive regions having at least one diffractive characteristic different than a diffractive characteristic of said diffractive regions;
each cell and the at least two substructure regions within each cell being small enough to be not readily discernable to the unaided eye of a human viewer;
each cell having at least one substructure that is a diffractive region and at least one substructure region that is a non-diffractive or modulated-diffractive region, the ratio of the area of the diffractive region to the area of the non-diffractive or modulated-diffractive region of the at least two substructure regions in each cell of the encoded or unencoded cells being substantially identical;
the encoded component not visible to an unaided eye being encoded into said pattern by substantially reversing the contrast of each cell forming a portion of the encoded covert image component to change diffractive portions to non-diffractive or modulated-diffractive portions, and to change non-diffractive or modulated-diffractive portions to diffractive portions, the brightness within each cell remaining substantially unchanged as a result of the contrast reversal by maintaining a substantially constant ratio between the diffractive area to the non-diffractive or modulated-diffractive areas among the substructure regions within the cells so that the same amount of light is diffracted to the viewing location from the cells; and
the encoded component not readily visible to an unaided eye of said viewer being rendered visible to the unaided eye of said viewer when viewed through an external decoding device.

77. A secure document as in claim 76, wherein:

said document is selected from the set of documents consisting of: a bank check, a currency, a ticket, a banknote, a credit card, a debit cards, an identification card, a passport, a certificate, a visa, a travel document, a travelers check, an anti-counterfeiting label or marking, a postage stamp, a birth certificate, a death certificate, a vehicle registration, a vehicle identification marking, a vehicle registration card, a health care identification or benefit card or document, a real property deed, a controlled substance identification, a certificate of title, a tax seal, a voter identification seal, a drivers' license, an optical data storage devices, a CD, a DVD, an item of computer software, a facility access card, and combinations thereof; and said substrate is selected from the set of substrates consisting of: paper, plastic, metal, polymers, embossable reflective materials, embossable refractive materials, metallized papers, metallized polymers, metallized foils, thermoplastic materials, hologram substrates, and combinations thereof.

78. A method for making a security device, said method comprising:

generating a holographic image recording including a first non-covert holographic image having a plurality of diffractive grating elements and second covert image within said plurality of diffractive gratings having a pattern;

forming said pattern as an array of cells having substructure regions within each cell that present an encoded component not readily discernable to the unaided eye of a viewer from any viewing angle without a separate decoder; said substructure regions supporting a contrast reversal upon being decoded and having characteristics selected from the set: (i) diffractive regions, (ii) modulated-diffractive regions, and (iii) non-diffractive regions; said modulated-diffractive regions having at least one diffractive characteristic different than a diffractive characteristic of said diffractive regions, at least two substructure regions in each cell having different characteristics from the set diffractive, modulated-diffractive, and non-diffractive characteristics;

a ratio of the area of the different substructure regions within each cell being arbitrary but substantially identical.

79. The security device in claim 1, wherein said security device features include features at spatial frequencies greater than or equal to 72 lines per inch.

80. The security device in claim 1, wherein said security device features include features at spatial frequencies greater than or equal to 150 lines per inch.

81. The security device in claim 53, wherein said second gratings reveal a different overt image than the first gratings.

82. A security device comprising:

a pattern formed from an array of cells having substructure regions within each cell and displaying an unencoded component visible to the unaided eye of a viewer and an encoded covert image component not readily discernable to the unaided eye of a viewer from any viewing angle without a separate decoder;

said substructure regions supporting a contrast reversal upon being decoded and having characteristics selected from the set: (i) diffractive regions, (ii) modulated-diffractive regions, and (iii) non-diffractive regions; said modulated-diffractive regions having at least one diffractive characteristic different than a diffractive characteristic of said diffractive regions, at least two substructure regions in each cell having different characteristics from the set diffractive, modulated-diffractive, and non-diffractive characteristics;

a ratio of the area of the different substructure regions within each cell being arbitrary but substantially identical; and said pattern organized as an array of cells, each cell being small enough to be not readily discernable to the unaided eye of a human viewer.

83. A security device as in claim 82, wherein:

each cell having at least two of said substructure regions and each of said at least two substructure regions having at least one diffractive region and at least one non-diffractive or modulated-diffractive region, the ratio of the area of the diffractive region to the area of the non-diffractive or modulated-diffractive region in each of the at least two substructure regions in each cell being substantially identical.

84. A security device as in claim 83, wherein:

the encoded covert image component not visible to an unaided eye being encoded into said pattern by substantially reversing the contrast of each cell substructure region forming a portion of the encoded covert image component to change diffractive portions to non-diffractive or modulated-diffractive portions, and to change non-diffractive or modulated-diffractive portions to diffractive portions, the brightness within each cell remaining substantially unchanged as a result of the contrast reversal by adjusting the diffractive areas of the substructure regions within each cell to form a substantially constant diffractive area among the substructure regions within the cells so that the same amount of light is diffracted to the viewing location from the cells; and the encoded component not readily visible to an unaided eye of said viewer being rendered visible to the unaided eye of said viewer when viewed through an external decoding device.

85. A security device comprising:

a plurality of cells including field cells and image cells encoding a covert image, said field cells and said image cells operating to diffract light in a direction relative to a viewing location;

said plurality of both field cells and image cells having either substantially identical or similarly shaped substructures, and said substructures comprised of regions with characteristics selected from the set: (i) diffractive regions, (ii) modulated-diffractive regions, and (iii) non-diffractive regions; said modulated-diffractive regions having at least one diffractive characteristic different than a diffractive characteristic of said diffractive regions;

at least two substructure regions in each cell having different characteristics from the set diffractive, modulated-diffractive, and non-diffractive characteristics;

said image cells differing from said field cells by a contrast reversal, said contrast reversal achieved by filling spatially correspondent substructure regions of image cells and field cells with diffractive, modulated-diffractive, or non-diffractive characteristics which are different from each other, and a ratio of the area of the different substructure regions within a cell to each other being arbitrary but substantially identical for both said image cells and said field cells.

86. A security device as in claim 85, wherein:
the covert image is capable of being rendered visible to the unaided eye of said viewer when viewed through an external decoding device that differentially alters the ratio in said image cells relative to the ratio in said field cells.

87. A security device as in claim 86, wherein said plurality of cells are organized as an array.

88. A security device as in claim 87, wherein said field cells and said image cells are operative to direct light in a direction relative to a viewing location when illuminated by an external illumination source.

89. A security device in claim 88, wherein said image and filed cells being too small to be individually resolved by the unaided eye of a viewer and said covert image not being easily visible to an unaided eye of a viewer independent of its size.

90. A security device as in claim 89, wherein said ratio is chosen so that that the apparent brightness from each of the plurality of cells as visible to the unaided eye of a viewer from said viewing location without an external decoder is substantially the same for said image cells and said field cells.

91. A security device as in claim 90, wherein said image cell substructure region and said field cell substructure region are at substantially corresponding locations within the image cells and field cells.

92. A security device as in claim 91, wherein said correspondent substructure regions have a location overlap but have a different size, a different area, a different shape, a different location within their respective cells, or a combination of these differences.

93. A security device as in claim 92, wherein said modulated-diffractive region at least one diffractive characteristic different than said diffractive regions is selected from the set consisting of: (i) a different diffractive grating angular orientation relative to the grating angular orientation of said diffractive region; (ii) a different spatial frequency relative to the spatial frequency of the diffractive region diffractive grating; and (iii) a combination of a different spatial frequency and grating angular orientation.

94. A security device as in claim 93, wherein said substantially the same ratio is an identical ratio for said image cells and for said field cells.

95. A security device as in claim 93, wherein said substantially the same ratio is a ratio within a ratio range such that said encoded covert image is not detectable by said viewer from said viewing location without an external decoding device by gray-level or light value differences.

96. A security device as in claim 95, further comprising a decoder for overlaying onto said security device to decode the covert image, said decoder operating as a mask to render the covert image visible to the unaided eye of said viewer by differentially altering the area ratio in said image cells relative to the ratio in said field cells.

97. A security device as in claim 96, wherein:
said plurality of cells are arranged in a regular array having an array cell spacing; and said decoder comprises a binary screen having a regular decoder array of opaque dots on a transparent field or a regular array of transparent dots on an opaque field, the array cell spacing and the decoder array spacing being substantially the same spacing or an integral multiple thereof.

98. A security device as in claim 97, wherein: said opaque or transparent dots are selected from the set of geometrical shapes consisting of: round dots, circles, ovals, squares, rectangles, triangles, pentagons, hexagons, regular or irregular polygons, symbols, or combinations thereof.

99. A secure document comprising:
a substrate;
a security pattern formed integral with or carried by said substrate;
said security pattern formed from a plurality of cells including field cells and image cells encoding a covert image, said field cells and said image cells operating to diffract light in a direction relative to a viewing location;
said plurality of both field cells and image cells having either substantially identical or similarly shaped substructures, and said substructures comprised of regions with characteristics selected from the set: (i) diffractive regions, (ii) modulated-diffractive regions, and (iii) non-diffractive regions; said modulated-diffractive regions having at least one diffractive characteristic different than a diffractive characteristic of said diffractive regions;
at least two substructure regions in each cell having different characteristics from the set diffractive, modulated-diffractive, and non-diffractive characteristics;
said image cells differing from said field cells by a contrast reversal, said contrast reversal achieved by filling spatially correspondent substructure regions of image cells and field cells with diffractive, modulated-diffractive, or non-diffractive characteristics which are different from each other; and
a ratio of the area of the different substructure regions within a cell to each other being arbitrary but substantially identical for both said image cells and said field cells.

100. A secure document according to claim 99, wherein:
said document is selected from the set of documents consisting of: a bank check, a currency, a ticket, a banknote, a credit card, a debit cards, an identification card, a passport, a certificate, a visa, a travel document, a travelers check, an anti-counterfeiting label or marking, a postage stamp, a birth certificate, a death certificate, a vehicle registration, a vehicle identification marking, a vehicle registration card, a health care identification or benefit card or document, a real property deed, a controlled substance identification, a certificate of title, a tax seal, a voter identification seal, a drivers' license, an optical data storage devices, a CD, a DVD, an item of computer software, a facility access card, and combinations thereof; and
said substrate is selected from the set of substrates consisting of: paper, plastic, metal, polymers, embossable reflective materials, embossable refractive materials, metallized papers, metallized polymers, metallized foils, thermoplastic materials, hologram substrates, and combinations thereof.

101. A method for making a security device, said method comprising:
generating a holographic image recording as a pattern on a substrate, the holographic image including a covert holographic image contained substantially within an area containing a non-covert image;
forming said pattern as a plurality of cells including field cells and image cells encoding a covert image, said field cells and said image cells operating to diffract light in a direction relative to a viewing location;
said plurality of both field cells and image cells having either substantially identical or similarly shaped substructures, and said substructures comprised of regions with characteristics selected from the set: (i) diffractive regions, (ii) modulated-diffractive regions, and (iii) non-diffractive regions; said modulated-diffractive regions having at least one diffractive characteristic different than a diffractive characteristic of said diffractive regions;

at least two substructure regions in each cell having different characteristics from the set diffractive, modulated-diffractive, and non-diffractive characteristics;

said image cells differing from said field cells by a contrast reversal, said contrast reversal achieved by filling spatially correspondent substructure regions of image cells and field cells with diffractive, modulated-diffractive, or non-diffractive characteristics which are different from each other; and a ratio of the area of the different substructure regions within a cell to each other being arbitrary but substantially identical for both said image cells and said field cells.

102. The method of claim 101, wherein each of the cells is square having a cell length substantially equal to a cell width and the plurality of cells are arranged in a regular rectangular array with the center to center spacing of the cells being substantially equal to the length or the width.

103. The security device in claim 1, wherein each of the cells is square having a cell length substantially equal to a cell width and the plurality of cells are arranged in a regular rectangular array with the center to center spacing of the cells being substantially equal to the length or the width.

104. The method of claim 78, wherein each of the cells is square having a cell length substantially equal to a cell width and the plurality of cells are arranged in a regular rectangular array with the center to center spacing of the cells being substantially equal to the length or the width.

105. The security device in claim 85, wherein each of the cells is square having a cell length substantially equal to a cell width and the plurality of cells are arranged in a regular rectangular array with the center to center spacing of the cells being substantially equal to the length or the width.

106. The security device in claim 104, wherein the secure document is decodable using a decoder that has a regular rectangular array of opaque dots arranged in a regular rectangular array with the center to center spacing of the dots being substantially equal to the cell length or the cell width of the cells in the secure document.

107. The secure document in claim 99, wherein each of the cells is square having a cell length substantially equal to a cell width and the plurality of cells are arranged in a regular rectangular array with the center to center spacing of the cells being substantially equal to the length or the width.

108. The secure document in claim 107, wherein the secure document is decodable using a decoder that has a regular rectangular array of opaque dots arranged in a regular rectangular array with the center to center spacing of the dots being substantially equal to the cell length or the cell width of the cells in the secure document.

* * * * *